United States Patent
Sumbul et al.

(10) Patent No.: US 10,713,558 B2
(45) Date of Patent: Jul. 14, 2020

(54) NEURAL NETWORK WITH RECONFIGURABLE SPARSE CONNECTIVITY AND ONLINE LEARNING

(71) Applicant: Intel Corporation, Santa Clara, CA (US)

(72) Inventors: Huseyin Ekin Sumbul, Portland, OR (US); Gregory K. Chen, Portland, OR (US); Raghavan Kumar, Hillsboro, OR (US); Phil Knag, Portland, OR (US); Ram K. Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 711 days.

(21) Appl. No.: 15/395,231

(22) Filed: Dec. 30, 2016

(65) Prior Publication Data

US 2018/0189631 A1 Jul. 5, 2018

(51) Int. Cl.
*G06N 3/04* (2006.01)
*G06N 3/063* (2006.01)
*G06N 3/08* (2006.01)

(52) U.S. Cl.
CPC .............. *G06N 3/04* (2013.01); *G06N 3/049* (2013.01); *G06N 3/063* (2013.01); *G06N 3/08* (2013.01)

(58) Field of Classification Search
CPC ...................................................... G06N 3/04
See application file for complete search history.

(56) References Cited

U.S. PATENT DOCUMENTS

| 5,913,070 | A * | 6/1999 | Hillis | G06F 9/5066 |
| | | | | 712/13 |
| 9,269,044 | B2 * | 2/2016 | Akopyan | G06N 3/063 |
| 2003/0031167 | A1 * | 2/2003 | Singh | H04L 45/04 |
| | | | | 370/352 |
| 2007/0165547 | A1 * | 7/2007 | Lindwer | G06F 15/8023 |
| | | | | 370/256 |
| 2014/0122400 | A1 * | 5/2014 | Szatmary | G06N 3/02 |
| | | | | 706/15 |
| 2014/0317035 | A1 * | 10/2014 | Szatmary | G06N 3/049 |
| | | | | 706/27 |
| 2015/0052094 | A1 | 2/2015 | Hunzinger et al. | |
| 2016/0098629 | A1 * | 4/2016 | Lipasti | G06N 3/04 |
| | | | | 706/26 |
| 2017/0185888 | A1 | 6/2017 | Chen et al. | |
| 2017/0277628 | A1 * | 9/2017 | Paul | G06N 3/063 |
| 2017/0286827 | A1 | 10/2017 | Chen et al. | |
| 2018/0181861 | A1 | 6/2018 | Sumbul et al. | |

(Continued)

OTHER PUBLICATIONS

Krawczyk, Hugo. "LFSR-based Hashing and Authentication." Advances in Cryptology—Crypto '94, LNCDS 839, pp. 129-139, 1994) (Year: 1994).*

(Continued)

*Primary Examiner* — Vincent Gonzales
*Assistant Examiner* — Joseph V Nguyen
(74) *Attorney, Agent, or Firm* — Alliance IP, LLC

(57) ABSTRACT

In one embodiment, a method comprises determining that a membrane potential of a first neuron of a first neuron core exceeds a threshold; determining a first plurality of synapse cores that each store at least one synapse weight associated with the first neuron; and sending a spike message to the determined first plurality of synapse cores.

22 Claims, 13 Drawing Sheets

(56) References Cited

U.S. PATENT DOCUMENTS

2018/0189645 A1 7/2018 Chen et al.
2018/0189648 A1 7/2018 Sengupta et al.

OTHER PUBLICATIONS

Extended European Search Report for EP Application No. 17203932.3 dated May 28, 2018, 12 pages.
Imam, N. et al., "Neural Spiking Dynamics in Asynchronous Digital Circuits", The 2013 International Joint Conference on Neural Networks (IJCNN), IEEE, Aug. 4, 2013, pp. 1-8.
Merolla, Paul et al., "A Multicast Tree Router for Multichip Neuromorphic Systems", IEEE Transactions on Circuits and Systems I: Regular Papers, IEEE, US, vol. 61, No. 3, Mar. 2014, pp. 820-833.
Wu, J. et al., "A Multicast Routing Scheme for a Universal Spiking Neural Network Architecture", Computer Journal., vol. 53, No. 3, Apr. 8, 2009, pp. 280-288.
Zamarreno-Ramos, C. et al., "Multicasting Mesh AER: A Scalable Assembly Approach for Reconfigurable Neuromorphic Structured AER Systems Application to ConvNets", IEEE Transactions on Biomedical Circuits and Systems, IEEE, US, vol. 7, No. 1, Feb. 2013, pp. 82-102.
Chen et al., U.S. Appl. No. 14/757,397 entitled "Interconnection Scheme for Reconfigurable Neuromorphis Hardware", filed Dec. 23, 2015; 56 pages.
Chen et al., U.S. Appl. No. 15/088,543 entitled "Apparatus and Method for a Digital neuromorphic Processor", filed Apr. 1, 2016; 43 pages.
Chen et al., U.S. Appl. No. 15/394,897 entitled "Neuromorphic Computer with Reconfigurable Memory Mapping for Various Neural Network Topologies", filed Dec. 30, 2016; 58 pages.
Huseyin et al., U.S. Appl. No. 15/392,407 entitled "Neuromorphic Circuits for Storing and Generating Connectivity Information", filed Dec. 28, 2016; 49 pages.
Sengupta et al., U.S. Appl. No. 15/394,976 entitled "Event Driven and Time Hopping Neural Network", filed Dec. 30, 2016; 53 pages.

\* cited by examiner

US 10,713,558 B2

NEURAL NETWORK WITH RECONFIGURABLE SPARSE CONNECTIVITY AND ONLINE LEARNING

FIELD

The present disclosure relates in general to the field of computer development, and more specifically, to a neural network with reconfigurable sparse connectivity and online learning.

BACKGROUND

A neural network may include a group of neurons loosely modeled after the structure of a biological brain which includes large clusters of neurons connected by synapses. In a neural network, neurons are connected to other neurons via links which may be excitatory or inhibitory in their effect on the activation state of connected neurons. A neuron may perform a function utilizing the values of its inputs to update a membrane potential of the neuron. A neuron may propagate a spike signal to connected neurons when a threshold associated with the neuron is surpassed. A neural network may be trained or otherwise adapted to perform various data processing tasks, such as computer vision tasks, speech recognition tasks, or other suitable computing tasks.

BRIEF DESCRIPTION OF THE DRAWINGS

Like reference numbers and designations in the various drawings indicate like elements.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to specific integrated circuits, such as computing platforms or microprocessors, other embodiments are applicable to other types of integrated circuits and logic devices. Similar techniques and teachings of embodiments described herein may be applied to other types of circuits or semiconductor devices. For example, the disclosed embodiments may be used in various devices, such as server computer systems, desktop computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency.

Figure 1:
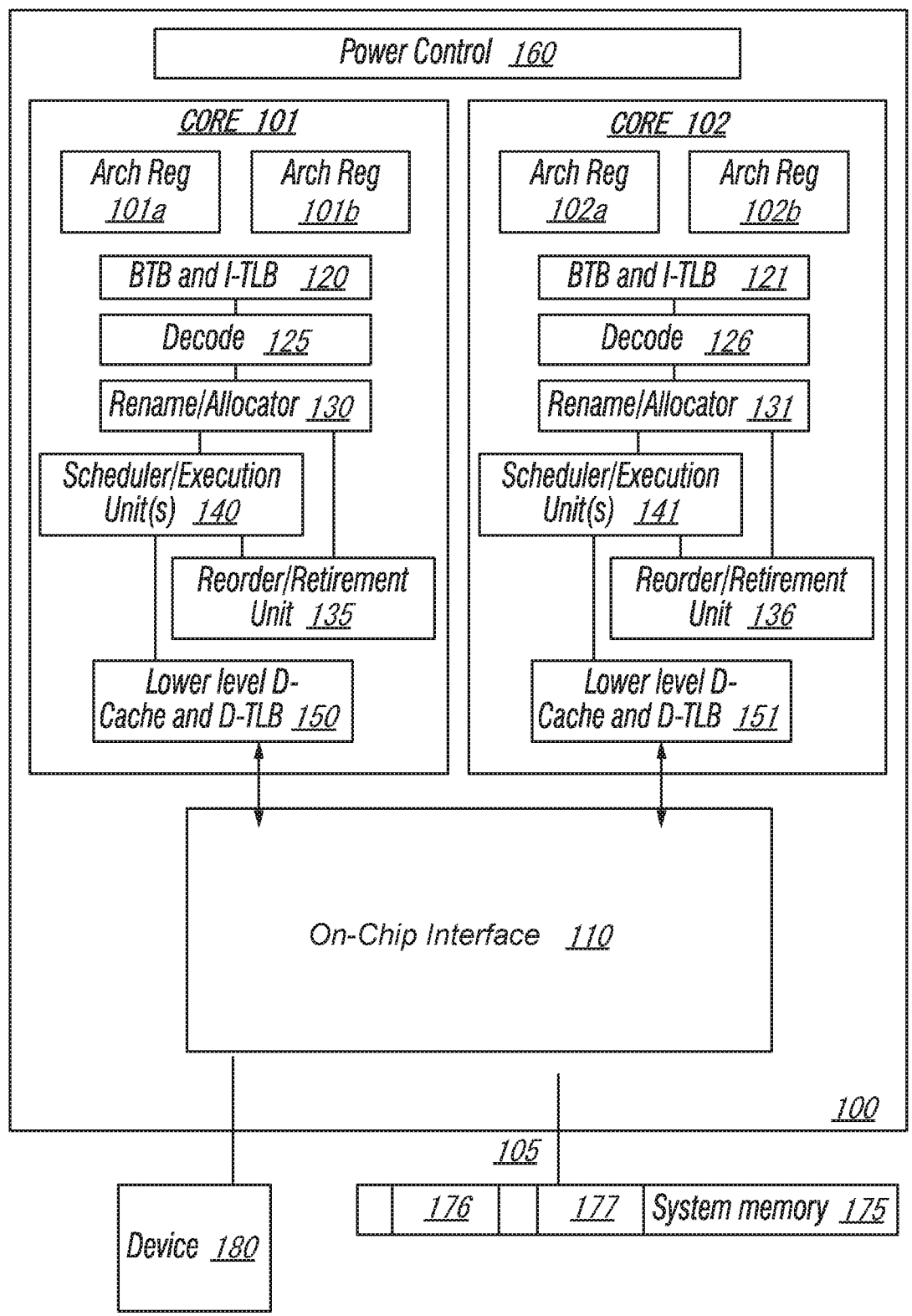
FIG. 1 illustrates a block diagram for an example computing system including a multicore processor that may implement a neural network in accordance with certain embodiments.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 150, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files (RFs) to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
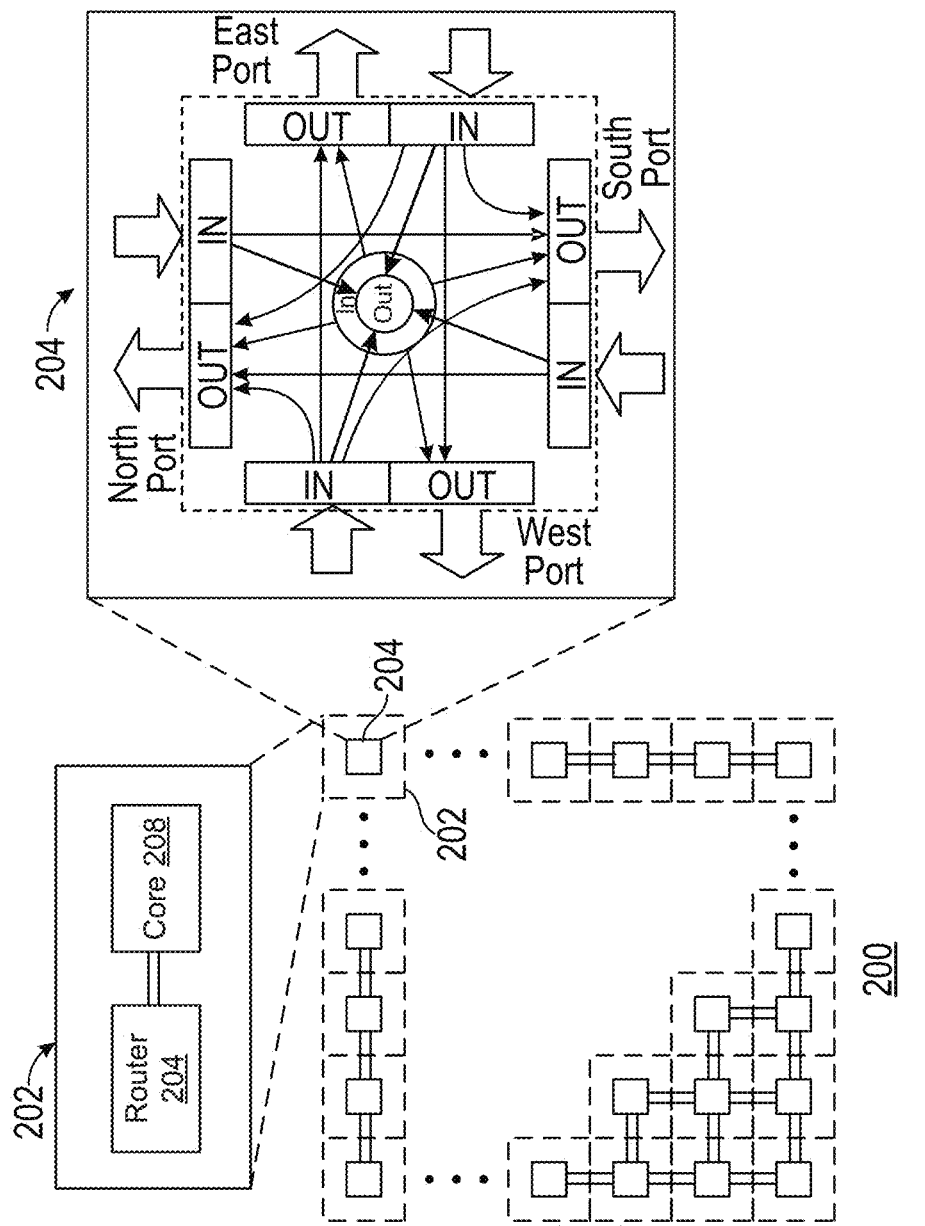
FIG. 2 illustrates a block diagram of a processor comprising a network on a chip (NoC) system that may implement a neural network in accordance with certain embodiments.

FIG. 2 illustrates a block diagram of a processor 200 comprising a network on a chip (NoC) system that may implement a neural network in accordance with certain embodiments. The processor 200 may include any processor or processing device, such as a microprocessor, an embedded processor, a digital signal processor (DSP), a network processor, a handheld processor, an application processor, a co-processor, an SoC, or other device to execute code and/or perform other processing operations. In particular embodiments, processor 200 is implemented on a single die. Processor 200 may include any of the components of processor 100 and/or have any of the characteristics of processor 100.

In the embodiment depicted, processor 200 includes a plurality of network elements 202 arranged in a grid network and coupled to each other with bi-directional links. However, an NoC in accordance with various embodiments of the present disclosure may be applied to any suitable network topologies (e.g., a hierarchical network or a ring network), sizes, bus widths, and processes. In the embodiment depicted, each network element 202 includes a router 204 and a core 208 (which in some embodiments may be a neuromorphic core), however in other embodiments, multiple cores from different network elements 202 may share a single router 204. The routers 204 may be communicatively linked with one another in a network, such as a packet-switched network and/or a circuit-switched network, thus enabling communication between components (such as cores, storage elements, or other logic blocks) of the NoC that are connected to the routers. In the embodiment depicted, each router 204 is communicatively coupled to its own core 208. In various embodiments, each router 204 may be communicatively coupled to multiple cores 208 (or other processing elements or logic blocks). As used herein, a reference to a core may also apply to other embodiments where a different logic block is used in place of a core. For example, various logic blocks may comprise a hardware accelerator (e.g., a graphics accelerator, multimedia accelerator, or video encode/decode accelerator), I/O block, memory controller, or other suitable fixed function logic. The processor 200 may include any number of processing elements or other logic blocks that may be symmetric or asymmetric. For example, the cores 208 of processor 200 may include asymmetric cores or symmetric cores. Processor 200 may include logic to operate as either or both of a packet-switched network and a circuit-switched network to provide intra-die communication.

In particular embodiments, packets may be communicated among the various routers 204 using resources of a packet-switched network. That is, the packet-switched network may provide communication between the routers (and their associated cores). The packets may include a control portion and a data portion. The control portion may include a destination address of the packet, and the data portion may contain the specific data to be communicated on the die 100. For example, the control portion may include a destination address that corresponds to one of the network elements or cores of the die. In some embodiments, the packet-switched network includes buffering logic because a dedicated path is not assured from a source to a destination and so a packet may need to be stopped temporarily if two or more packets need to traverse the same link or interconnect. As an example, the packets may be buffered (e.g., by flip flops) at each of the respective routers as the packet travels from a source to a destination. In other embodiments, the buffering logic may be omitted and packets may be dropped when collision occurs. The packets may be received, transmitted and processed by the routers 204. The packet-switched network may use point-to-point communication between neighboring routers. The control portions of the packets may be transferred between routers based on a packet clock, such as a 4 GHz clock. The data portion of the packets may be transferred between routers based on a similar clock, such as a 4 GHz clock.

In an embodiment, routers of processor 200 may be variously provided in two networks or communicate in two networks, such as a packet-switched network and a circuit-switched network. Such a communication approach may be termed a hybrid packet/circuit-switched network. In such embodiments, packets may be variously communicated among the various routers 204 using resources of the packet-switched network and the circuit-switched network. In order to transmit a single data packet, the circuit-switched network may allocate an entire path, whereas the packet-switched network may allocate only a single segment (or interconnect). In some embodiments, the packet-switched network may be utilized to reserve resources of the circuit-switched network for transmission of data between routers 204.

Router 204 may include a plurality of port sets to variously couple to and communicate with adjoining network elements 202. For example, circuit-switched and/or packet-switched signals may be communicated through these port sets. Port sets of router 204 may be logically divided, for example, according to the direction of adjoining network elements and/or the direction of traffic exchanges with such elements. For example, router 204 may include a north port set with input ("IN") and output ("OUT") ports configured to (respectively) receive communications from and send communications to a network element 202 located in a "north" direction with respect to router 204. Additionally or alternatively, router 204 may include similar port sets to interface with network elements located to the south, west, east, or other direction. In the embodiment depicted, router 204 is configured for X first, Y second routing wherein data moves first in the East/West direction and then in the North/South direction. In other embodiments, any suitable routing scheme may be used.

In various embodiments, router 204 further comprises another port set comprising an input port and an output port configured to receive and send (respectively) communications from and to another agent of the network. In the embodiment depicted, this port set is shown at the center of router 204. In one embodiment, these ports are for communications with logic that is adjacent to, is in communication with, or is otherwise associated with router 204, such as logic of a "local" core 208. Herein, this port set will be referred to as a "core port set," though it may interface with logic other than a core in some implementations. In various embodiments, the core port set may interface with multiple cores (e.g., when multiple cores share a single router) or the router 204 may include multiple core port sets that each interface with a respective core. In another embodiment, this port set is for communications with a network element which is in a next level of a network hierarchy higher than that of router 204. In one embodiment, the east and west directional links are on one metal layer, the north and south directional links on a second metal layer, and the core links on a third metal layer. In an embodiment, router 204 includes crossbar switching and arbitration logic to provide the paths of inter-port communication such as that shown in FIG. 2. Logic (such as core 208) in each network element may have a unique clock and/or voltage or may share a clock and/or voltage with one or more other components of the NoC.

In particular embodiments, a core 208 of a network element may comprise a neuromorphic core including one or more neurons. In various embodiments, a neuromorphic core may comprise any suitable logic for performing any of the functions described herein with respect to neurons. In various embodiments, a neuron may store neural state parameters in memory. In particular embodiments, logic of a neuromorphic core that performs the functions of a neuron may be shared among multiple neurons of the core.

Figure 3:
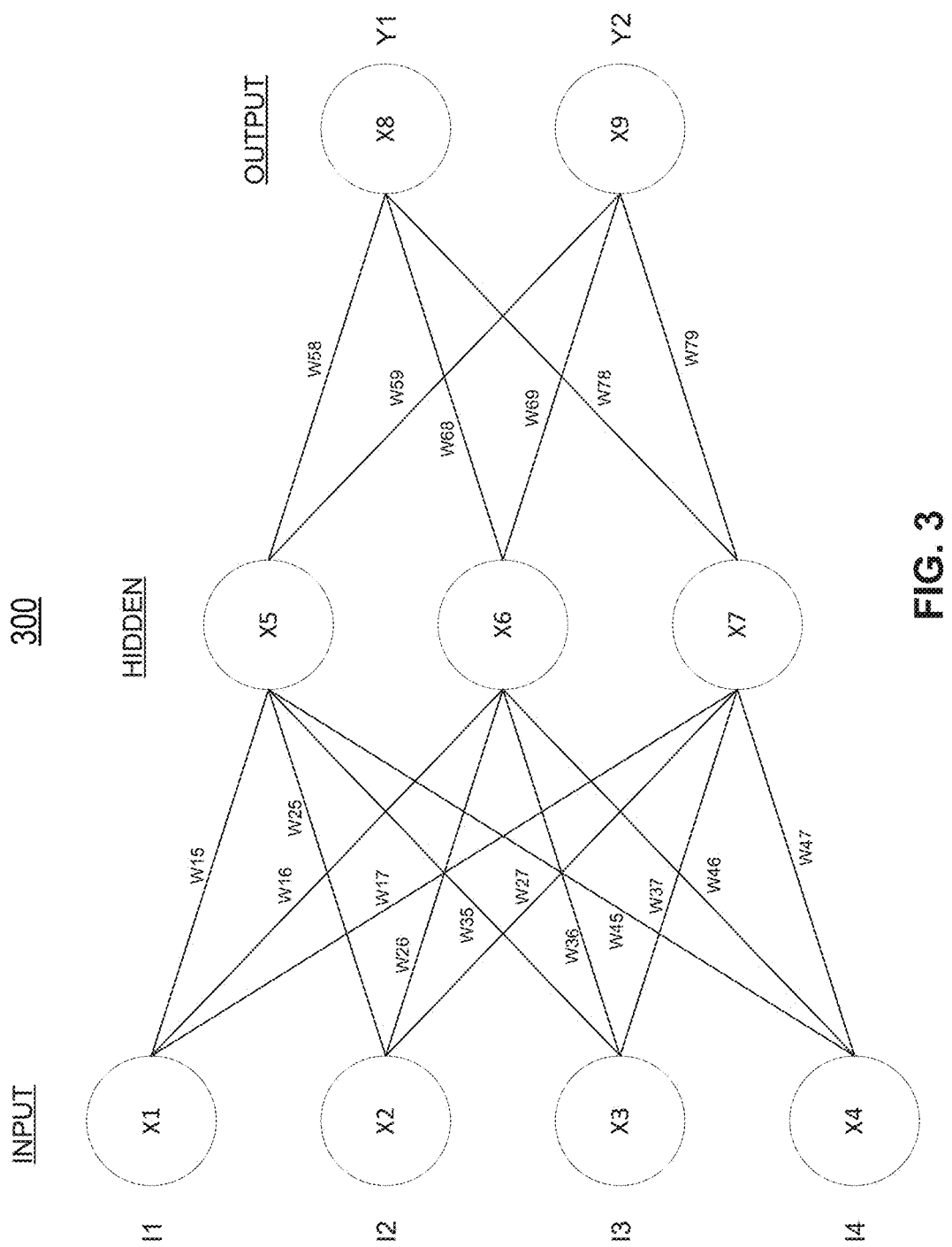
FIG. 3 illustrates an example portion of a neural network in accordance with certain embodiments.

FIG. 3 illustrates an example portion of a neural network 300 in accordance with certain embodiments. The neural network 300 includes neurons X1-X9. Neurons X1-X4 are input neurons that respectively receive primary inputs I1-I4 (which may be held constant while the neural network 300 processes an output). Any suitable primary inputs may be used. As one example, when neural network 300 performs image processing, a primary input value may be the value of a pixel from an image (and the value of the primary input may stay constant while the image is processed). As another example, when neural network 300 performs speech processing the primary input value applied to a particular input neuron may change over time based on changes to the input speech.

While a specific topology and connectivity scheme is shown in FIG. 3, the teachings of the present disclosure may be used in neural networks having any suitable topology and/or connectivity. For example, a neural network may be a feedforward neural network, a recurrent network, or other neural network with any suitable connectivity between neurons. In the embodiment depicted, each link between two neurons has a synaptic weight indicating the strength of the relationship between the two neurons. The synapse weights are depicted as WXY, where X indicates the pre-synaptic neuron and Y indicates the post-synaptic neuron. Links between the neurons may be excitatory or inhibitory in their effect on the activation state of connected neurons. For example, a spike that propagates from X1 to X5 may increase or decrease the membrane potential of X5 depending on the value of W15. In various embodiments, the connections may be directed or undirected.

In general, during each time-step, a neuron may receive any suitable inputs, such as a bias value or one or more input spikes from one or more other neurons. The bias value applied to a neuron may be a function of a primary input applied to an input neuron and/or some other value applied to a neuron (e.g., a constant value that may be adjusted during training or other operation of the neural network). In various embodiments, each neuron may be associated with its own bias value or a bias value could be applied to multiple neurons.

The neuron may perform a function utilizing the values of its inputs and its current membrane potential. For example, the inputs may be added to the current membrane potential of the neuron to generate an updated membrane potential. As another example, a non-linear function, such as a sigmoid transfer function, may be applied to the inputs and the current membrane potential. Any other suitable function may be used. The neuron then updates its membrane potential based on the output of the function. When the membrane potential of a neuron exceeds a threshold, the neuron may send spikes to each of its fan-out neurons (i.e., the neurons connected to the output of the spiking neuron). For example, when X1 spikes, the spike (and the appropriate synapse weights) may be propagated to X5, X6, and X7. As another example, when X5 spikes, the spikes (and the appropriate synapse weights) may be propagated to X8 and X9 (and in some embodiments to X2, X3, and X4).

In a particular embodiment, one or more memory arrays may comprise memory cells that store the synapse weights, membrane potentials, thresholds, outputs (e.g., the number of times that a neuron has spiked), bias amounts, or other values used during operation of the neural network 300. The number of bits used for each of these values may vary depending on the implementation. In the examples illustrated below, specific bit lengths and/or component sizes (e.g., memory array sizes) may be described with respect to particular elements, but in other embodiments any suitable bit lengths and/or component sizes may be used.

Large-scale neuromorphic systems are built by tiling neuron and synaptic blocks in a massively interconnected network connected by routers. As interconnect scaling approaches its limits, the interconnect may form a major bottleneck in large-scale neuromorphic systems. Hence traditional neuromorphic computers often limit the amount of fan-out and/or fan-in connections for a neuron (e.g., to 256 or other similar amount). However, biological neural networks typically have fan-out connections ranging up to 10,000 connections. Moreover, traditional neuromorphic computers are generally designed as all-to-all networks where a neuron connects to all the other neurons in a core or multiple cores, whereas a biological neural network may exhibit highly sparse connectivity. Although sparse connectivity may be implemented on fully connected networks, such implementations may lead to highly inefficient memory access in terms of area and power overheads. The inefficiencies may be further compounded when on-line biologically plausible learning rules (such as spike-timing dependent plasticity (STDP)) are supported by the network.

Various embodiments of the present disclosure provide a neuromorphic computer to implement a neural network with an extremely large number of fan-out connections (e.g., similar to or greater than the number of connections of a biological neural network), reconfigurable connectivity, and an online STDP learning mechanism, while mitigating interconnection bottlenecks and area and power overheads. A particular embodiment includes a 16 k-neuron digital spiking neural network (SNN) neuromorphic computer with reconfigurable sparse/dense connectivity and online learning. In various embodiments, the top-level architecture for the neuromorphic computer is a Network-on-Chip (NoC) based hardware implementation where modular nuero-synaptic or separate neuron and synapse cores are tiled and grouped to share a network router (alternatively each neuron core and/or synapse core may have its own router). Within a neuron core, neurons are grouped and time multiplexed. That is, the neurons share processing logic to save circuit area. The synaptic weights are stored in synapse cores. Spike generation and integration operations are handled in neuron cores while synaptic weight access and STDP based weight update operations are performed by synapse cores. Neuron cores and synapse cores communicate through routers to enable a fully flexible connectivity. Both neuron and synapse cores may include STDP hardware to enable online learning. In various embodiments, lightweight online address generation hardware based on a hashing function may be used to perform on-the-fly address generation for network connectivity (i.e., neuron to neuron connections). Connectivity of the network may be configured by loading permutation parameters to hashing function logic. Core-to-core communication on the NoC may be handled by "wildcard masked" multicasting in which network addresses and the number of addressed cores are indicated by the position and number of wildcard bits in the multicast address. In various embodiments, the NoC may implement a flattened butterfly type network to minimize the number of hops used to transport spike messages. In a particular embodiment, the routers include random number generators (RNGs) to drop packages randomly in order to avoid traffic deadlocks.

In various embodiments, neuromorphic computers described herein may be used to implement both sparsely and densely connected SNNs, as well as various different SNN types (e.g., Liquid State Machines, Restricted Boltzmann Machines, Excitatory-Inhibitory Neural Networks, etc.) and may also implement various online learning rules.

Various embodiments of the present disclosure may provide technical advantages. For example, the dynamic address generation logic may reduce the amount of memory used to store the network connectivity, thus saving leakage power and area. As another example, since neuron groups can borrow available synaptic memory space from other cores, the maximum fan-in and fan-out connections of a neuron within a core is not limited to the physical size of the available synaptic memory in the same core. As another example, wildcard masked multicasting may allow for a spike signal to be communicated to a single synapse core, multiple synapse cores, or all the synapse cores in order to retrieve the appropriate synapse weights. As yet another example, randomized message delivery and dropping provides stochastic hardware behavior, which may increase the overall classification accuracy of a neural network.

Figure 4:
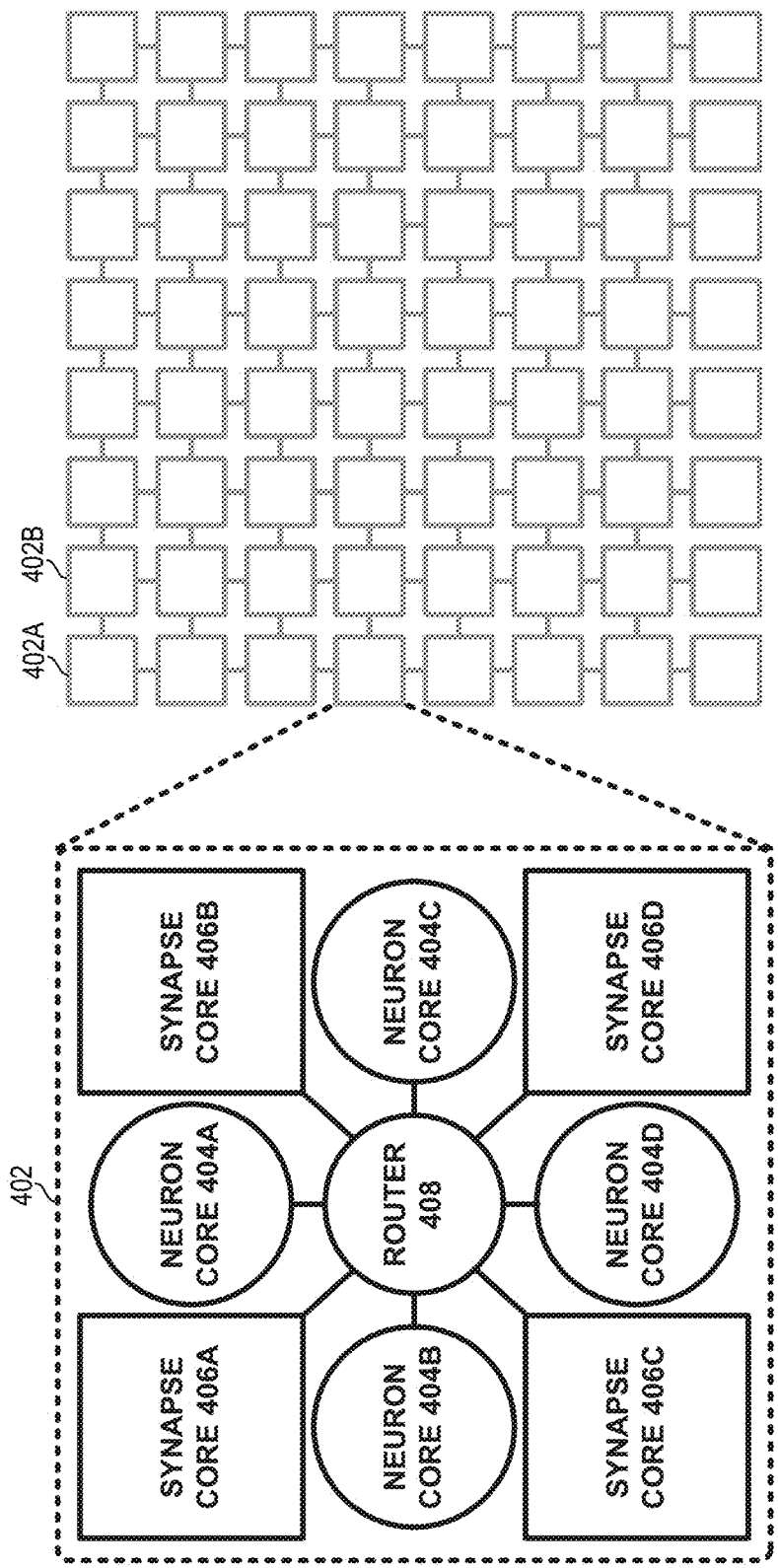
FIG. 4 depicts an example system of neurosynaptic core clusters in accordance with certain embodiments.

FIG. 4 depicts an example system of neurosynaptic core clusters 402 in accordance with certain embodiments. In the embodiment depicted, a neurosynaptic core cluster 402 includes four neuron cores 404A-D each comprising a number of neurons (e.g., 64 or other suitable number of neurons) that are connected with four synapse cores 406A-D through a router 408 (which may have any suitable characteristics of router 204 described above). In other embodiments, each neuron core 404 could be connected to its own router or the number of neuron cores 404 that are connected to a single router may be two, eight, or other suitable number, thus a neurosynaptic core cluster may include any suitable number of neuron cores and synapse cores connected to a router. In various embodiments, the neuron cores and synapse cores are modular and may be tiled with individual or shared routers depending on the availability of the hardware resources. In a particular embodiment, the system includes 256 neuron cores and 256 synapse cores tiled in 16×16 array.

The neurons of the neuron cores 404 perform the core arithmetic computations in a spiking neural network. Each neuron core may comprise one or more computational logic blocks that are time-multiplexed across the neurons of the neuron core 404. A computational logic block may be operable to perform various calculations for a neuron, such as updating the membrane potential of the neuron, determining whether the membrane potential exceeds a threshold, and/or other operations associated with a neuron. Herein, reference herein to a neuron may refer to logic used to implement the neuron (in various embodiments the neuron may emulate various behaviors of biological neurons). Such logic may include storage for one or more parameters associated with the neuron and computational logic to update the membrane potential of the neuron. In some embodiments, the logic used to implement a neuron may overlap with the logic used to implement one or more other neurons (because in some embodiments the neuron may share computational logic with other neurons and control signals may determine which neuron is currently using the logic for processing).

Similar to the human brain, the neurons incorporate time into their operating model. A neuron does not send a spike during every propagation cycle, but sends a spike only if the membrane potential of the neuron exceeds a threshold. The time cycle in which the SNN operates is referred to as a time-step and a neuron can generate at most one spike in a time-step. When a neuron spikes, the spike is sent to all of the neuron's fan-out connections for subsequent processing. In a particular embodiment, a neuron core comprises leaky integrate-and-fire neurons, integrate-and-fire neurons, or other suitable neuron type. Each neuron core may comprise one or more computational logic blocks that are time-multiplexed across the neurons of the neuron core 404. A computational logic block may be operable to perform various calculations for a neuron, such as updating the membrane potential of the neuron, determining whether the membrane potential exceeds a threshold, and/or other operations associated with a neuron.

Each synapse core 406 includes a synapse array memory and associated logic (e.g., logic to write synapse weights to the synapse array memory, access the synapse weights, and/or update the synapse weights). In various embodiments, a synapse core 406 may be collocated with a neuron core such that the neuron core may communicate directly with the synapse core 406 (as opposed to communicating with the synapse core 406 via a router). In one embodiment, the synapse array stores 16 k 8-bit weights and thus each neurosynaptic core group 402 includes 64 KB of memory reserved for synapse weights.

Figure 5:
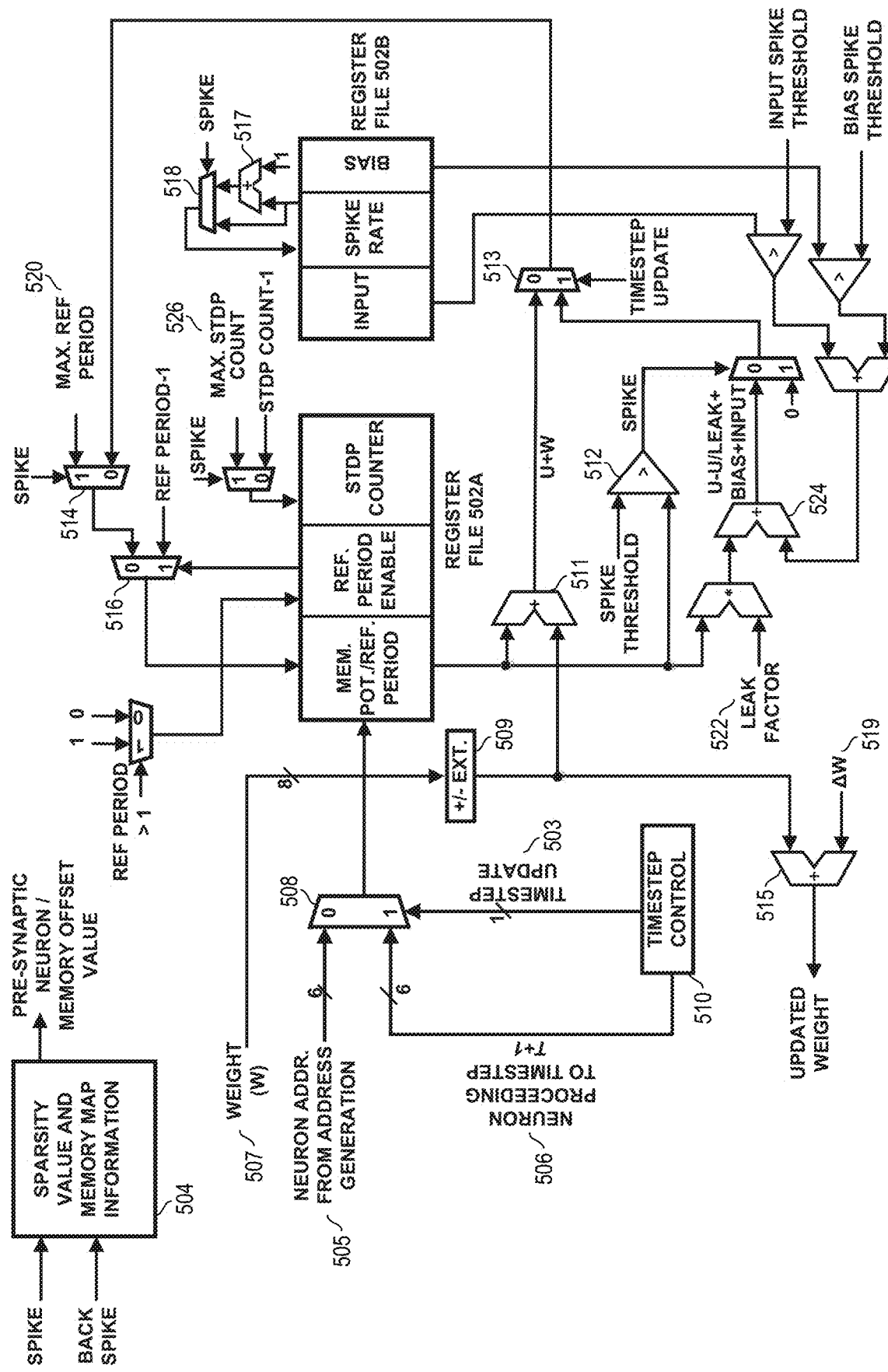
FIG. 5 depicts an example architecture of a neuron core in accordance with certain embodiments.

FIG. 5 depicts an example architecture of a neuron core 504 in accordance with certain embodiments. In the embodiment depicted, the neuron state variables (including the membrane potential, refractory period, a refractory period enable bit, an STDP counter, input, spike rate, and bias of each neuron) are stored in two register files 502A and 502B. The neuron state variables are split between the two register files such that the majority of the operations fetch data from only one of the two register files in order to minimize energy consumption. In other embodiments, the neuron state variables may be stored in any suitable memory structures (such as any of the memory structures described herein) in any suitable arrangement. In a particular embodiment, each neuron performs at least three major operations including incoming weight integration, time-step update and spike generation, and STDP based weight update.

An example implementation of incoming weight integration will now be described with reference to FIG. 5. When the time-step update signal 503 is not active, mux 508 may pass through an address 505 of a neuron that has received a spike from another neuron. This neuron address 505 may be obtained in any suitable manner. In a particular embodiment, the neuron address is received from address generation logic of a synapse core (when a spike is generated it is first sent to one or more synapse cores to retrieve the appropriate synapse weights which are then sent to each fan out neuron along with the address of the fan-out neuron). A weight 507 of a synapse between the spiking neuron (the pre-synaptic neuron) and the neuron receiving the spike is received in connection with the address of the neuron receiving the spike. A sign extension block 509 may modify the sign of the received weight based on whether the corresponding synapse is excitatory or inhibitory. The membrane potential of the neuron identified by the address 505 is fetched from register file 502A and combined by adder 511 with the weight output by sign extension block 509 (in other embodiments the weight may be used to update the membrane potential according to any suitable transfer function). The result (U+W) is passed through mux 513, mux 514, and mux 516 (unless the neuron is in a refractory period) and used to overwrite the previous membrane potential of the neuron receiving the spike. If additional spikes are received at the addressed neuron (or for other neurons of the neuron core), the weights of these spikes may be added to the appropriate membrane potential in like manner.

An example implementation of a time-step update and spike generation operation will now be described with reference to FIG. 5. When the time-step update occurs, the time-step update signal 503 is activated and a neuron address of the neuron core is provided by time-step control logic 510 to the mux 508 and passed through the mux to index neuron state variables of register file 502A and 502B. In a particular embodiment, the address 506 is an address of a neuron selected at random from the neuron core. The random address may be generated from the address set of the neurons in the neuron core by time-step control logic 510 in order to randomize the order in which the neurons are updated during a particular time-step (since deterministic ordering during the update may introduce correlation between events sharing hardware resources, resulting in systematic dropping that does not look like random noise and degrades the ability of the neural network to perform a workload). During the processing of a time-step, the time-step control logic 510 may iterate through all of the available neuron addresses (in a random order) such that an address of each neuron is supplied to mux 508 (and used to index the neuron state variables associated with the particular neuron) for a portion of the processing of the time-step until each neuron has been processed. As referenced above, time-step control logic 510 also outputs the time-step update signal 503 that may be activated once per neuron per time-step.

During the time-step update operation, each neuron of the neuron core may be processed as follows. A neuron's membrane potential is fetched from register file 502A and compared against a preset threshold by comparator 512 and the neuron generates a spike if the threshold is exceeded. In response to the generation of a spike, the neuron's spike rate counter is incremented (e.g., using adder 517 and mux 518). Upon the generation of a spike, the neuron also enters into a refractory period during which it cannot generate a spike and resets its membrane potential to 0. As depicted, upon a spike, the maximum refractory period 520 may be passed through muxes 514 and 516 and written to an entry of register file 502A. Because non-zero membrane potential and non-zero refractory period behaviors are mutually exclusive, the same entry in the register file may be used to store (depending on whether the neuron is in the refractory period or not) either the membrane potential (depicted as "mem. pot") or the refractory period (depicted as "ref. period"). A single bit (depicted as "ref period enable") is stored for each neuron to indicate whether the neuron is in refractory period or not. If the refractory period enable bit is set, then the entry stores the refractory period. Otherwise, the entry stores the membrane potential. The refractory period enable bit is reset at the end of the neuron's refractory period (the refractory period counter is reduced by one at each time-step and when the refractory period is no longer greater than one the refractory period enable bit is reset).

If the membrane potential is lower than the threshold, the neuron leaks a portion of its membrane potential (if the neuron is a leaky neuron). As just one example, the neuron may be multiplied by a leak factor 522. The bias and input values (i.e., the contribution from incoming spikes), if any, are also added to the membrane potential using, e.g., adder 524. If a spike is not present and the neuron is not in a refractory period, the updated membrane potential is passed through muxes 514 and 516 and written to the entry in register file 502A.

The input values stored in register file 502B are the primary inputs into the neural network. As one example, the primary inputs could be pixel intensities for image processing. The input values may be input by the user. A bias of register file 502B may also be user-input, but differ from the input in that the bias is constant over the input data set. The bias for a particular neuron is used to set the average spike rate of that neuron.

The input and bias of a neuron may be deterministically added in to the membrane potential. In this scenario, the input and bias spike thresholds and comparators do not exist. In a particular embodiment, the SNN has the ability to generate Poisson spike trains based on the input and bias to add noise to the system. In this embodiment, the input and bias spike thresholds are uniformly-distributed random numbers spanning the range of the input/bias that change every clock cycle. If the input or bias exceeds the respective threshold, then a fixed value is added into the membrane potential. Over time, the average value of the input or bias added into the membrane potential is proportional to the input or bias value stored in register file 502B.

An example implementation of STDP based weight update will now be described with reference to FIG. 5. In response to a spike by the addressed neuron, the neuron sets the STDP counter in register file A to its maximum value (Max. STDP Count 526), which gets decremented every time-step until the STDP counter reaches zero. The STDP counter counts down the time-steps starting at the occurrence of a spike and the value of the STDP counter when a spike is received may be used to determine the weight update value (i.e., weight delta) 519. LTP and LTD weight update values corresponding to the possible values of the STDP counter may be stored in look-up tables. In one embodiment, the magnitudes of the weight update values are based on how many time-steps are in between spikes generated by connected neurons. If the spikes are close together (e.g., as indicated by one or both of the STDP counters of the neurons) the magnitude of the weight update value is higher than if the spikes are far apart. When an incoming spike is received at the addressed neuron from another neuron (e.g., while time-step update signal 503 is not active), the accompanying weight is provided to adder 515 where it is combined with the weight update value 519 (which is based on the STDP counter of the neuron receiving the spike). The updated weight is then provided to the appropriate synapse core to be used to update the synapse weight. Determination of the weight update value is discussed in more detail in connection with FIGS. 6A and 6B.

Neuron core 404 also includes sparsity value and memory map information logic 504. Logic 504 stores connectivity information for the neurons of the neuron core. This connectivity information may include indications of one or more synapse cores that store synapse weights for the fan-in and fan-out neurons coupled to the neurons of neuron core 404. For example, the connectivity information may include one or more addresses of the synapse cores that store such weights. In various embodiments, one or more of these addresses may be a multicast address that identifies a plurality of the synaptic cores. In various embodiments, a synapse core address may include a portion that specifies the address of a router 408 connected to the synapse core and a multicast address may specify multiple routers that the spike message should be delivered to. These multicast addresses will be explained in more detail in connection with FIG. 8.

Logic 504 may also store memory offset locations and corresponding sparsity indicators. A memory offset location may indicate a particular location (e.g., a row of an SRAM or other memory structure) within a synapse array of a synapse core at which synapse weights for synapses coupled to a neuron of the neuron core are located as well as a sparsity indicator that identifies the sparsity of the synapse weights at that memory location (i.e., if the connectivity of the neurons of a neuron core to the neurons of another neuron core are sparse, then the synapse weights are going to occupy less space in a synapse array then if the neurons of a neuron core are fully connected with the neurons of another core). The sparsity indicators and memory offset locations allow the synapse cores to correctly access the synapse weights of the neurons connected to the neurons of the neuron core.

Sparsity value and memory map information logic 504 may receive an indication of whether a forward spike (to be sent to the fan-out neurons) or a back spike (to be sent to the fan-in neurons) is being generated and may output one or more synapse core addresses and memory address offsets for the synapse core addresses. One or more spike messages with the appropriate memory address offset(s) are then sent to the synapse cores identified by the synapse core addresses in order to retrieve the appropriate synapse weights. The spike messages may also include an identification of the particular neuron that spiked.

Figure 6A:
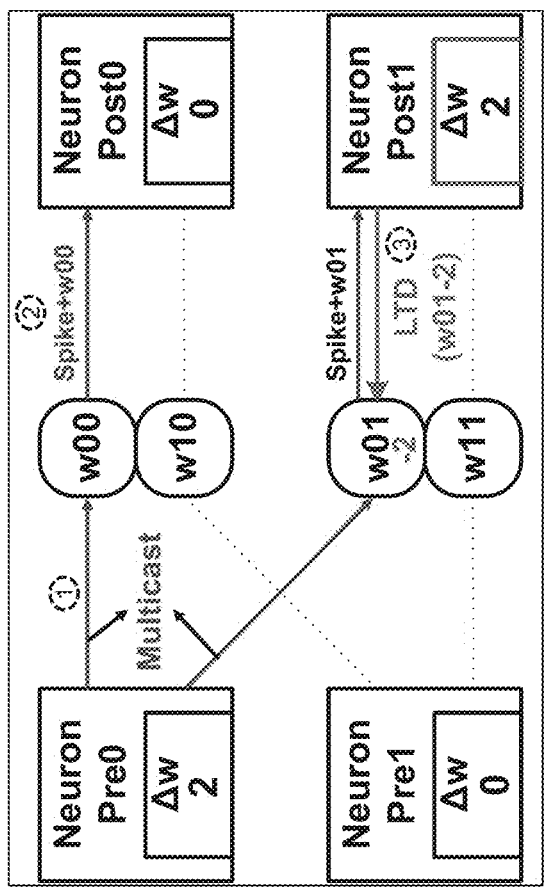
FIG. 6A illustrates an example flow for implementing a long-term depression (LTD) update in accordance with certain embodiments.
Figure 6B:
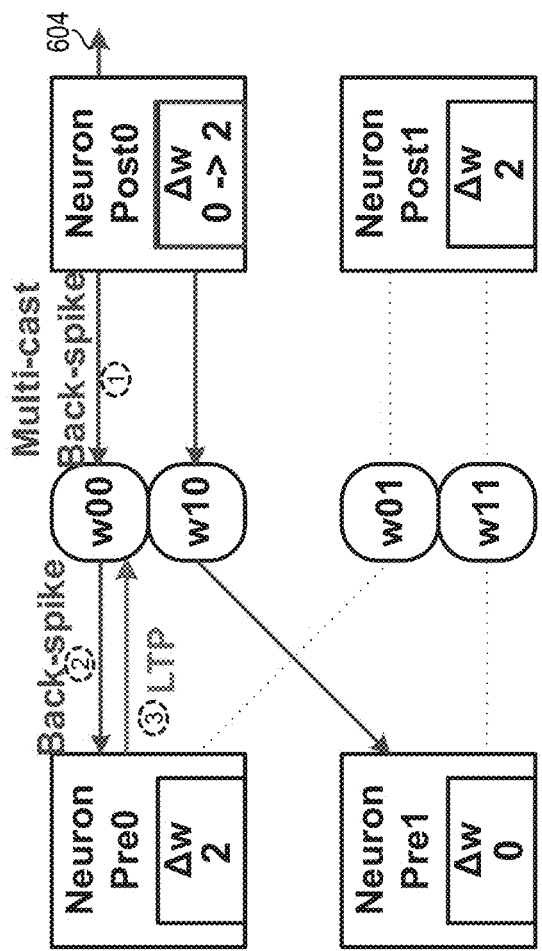
FIG. 6B illustrates an example flow for implementing a long-term potentiation (LTP) update in accordance with certain embodiments.

FIG. 6A illustrates an example flow for implementing a long-term depression (LTD) update in accordance with certain embodiments. FIG. 6B illustrates an example flow for implementing a long-term potentiation (LTP) update in accordance with certain embodiments. FIGS. 6A and 6B depict two pre-synaptic neurons (Neuron Pre0 and Neuron Pre1), two post-synaptic neurons (Neuron Post0 and Neuron Post1), and four synaptic weights between the neurons. The synaptic weights are indicated by wij, where i refers to the pre-synaptic (fan-in) neuron and j refers to the post-synaptic (fan-out) neuron.

FIGS. 6A and 6B also illustrate six example message types used in the neural network that may be sent across the routers 402. Message 1 of FIG. 6A illustrates a forward (FWD) spike message that may be sent from a neuron core to one or more synapse cores that includes synapse weights for the fan-out neurons of a neuron that generates a spike. The FWD spike message may also be termed a "pre-neuron to synapse message." Message 1 of FIG. 6B illustrates a backward (BCK) spike message that may be sent from a neuron core to one or more synapse cores that includes synapse weights for the fan-in neurons of a neuron that generates a spike. The BCK spike message may also be termed a "post-neuron to synapse message." In various embodiments, the FWD and BCK spike messages may be multicast messages sent to a plurality of synapse cores. Message 2 of FIG. 6A illustrates a FWD synapse weight message that is unicast from a synapse core to a neuron of a neuron core in response to the reception of a FWD spike message (a FWD spike message may result in multiple FWD synapse weight messages being sent to various neurons). The FWD synapse weight message may also be termed a "synapse to post-neuron message." Message 2 of FIG. 6B illustrates a BCK synapse weight message that is unicast from a synapse core to a neuron of a neuron core in response to the reception of a BCK spike message (a BCK spike message may result in multiple BCK synapse weight messages being sent to various neurons). The BCK synapse weight message may also be termed a "synapse to pre-neuron message." The FWD synapse weight message includes the synapse weight retrieved for a fan-out neuron and the BCK synapse weight message includes the synapse weight retrieved for a fan-in neuron. Message 3 of FIG. 6A illustrates a pre-synaptic learn message (i.e., LTD message) and message 3 of FIG. 6B illustrates a post-synaptic learn message (i.e., LTP message). A learn message is unicast to a synapse core and includes information used by the synapse core to update a synapse weight.

The LTD operation decreases a synapse weight and is triggered when the fan-in neuron spikes after the fan-out neuron. As described above, each neuron may include an STDP counter that corresponds to a weight update value (i.e., $\Delta w$). For purposes of explanation, in the embodiment described in FIGS. 6A and 6B the STDP counter is equal to the weight update value (e.g., if the STDP counter is 2 then the corresponding weight update value is 2 and if the counter is 0 then the corresponding weight update value is 0), though various embodiments may implement other relationships between the STDP counter and the weight update values. In the embodiment depicted, the weight update value (and thus the STDP counter) of Neuron Post0 is 0 (indicating that the last spike by Neuron Post0 was a relatively long time ago) and the weight update value of Neuron Post1 is 2 (indicating that the last spike by Neuron Post0 occurred more recently than the last spike by Neuron Post0). In the example depicted, when Neuron Pre0 spikes, a FWD spike message is multicast to Neuron Post0 and Neuron Post1. FWD synapse weight messages are then sent to the respective neurons. Neuron Post0 receives the FWD synapse weight message (including synapse weight w00) and uses the weight to update the membrane potential of Neuron Post0 (assuming Neuron Post0 is not in a refractory period). Because the STDP counter and corresponding weight update value of Neuron Post0 are 0, the synapse weight w00 is not updated (and thus no learn message is sent by Neuron Post0). Similarly, Neuron Post1 receives a FWD synapse weight message (including synapse weight w01) and uses the weight to update the membrane potential of Neuron Post1 (assuming Neuron Post1 is not in a refractory period). Because the STDP counter and corresponding weight update value of Neuron Post0 are 2, the received synapse weight w01 is decremented by 2 and sent back to the synapse core that stores w01 via a pre-synaptic learn (LTD) message sent from the neuron core of Neuron Post0. The weight included in the LTD message may be the updated weight depicted in FIG. 5. In this example, because the fan-out neuron spiked in the past, the information needed to update the synapse weight (i.e., the incoming weight and the STDP counter) is available to the neuron core of the neuron receiving the spike.

FIG. 6B illustrates an example flow for implementing a long-term potentiation (LTP) update in accordance with certain embodiments. The same neurons and synapse weights of FIG. 6A are depicted in FIG. 6B. The LTP operation increments a synapse weight and is triggered when the fan-out neuron spikes after the fan-in neuron. Because a fan-out neuron may have many fan-in neurons (e.g., 1,000 or more in some embodiments), it may not be feasible to store timing information of all of the fan-in neurons in the neuron core of the fan-out neuron. In various embodiments, in order to update the weight value, the post-synaptic neuron utilizes the STDP counter value of the pre-synaptic neuron. When the post-synaptic neuron (Neuron Post0) generates a spike (illustrated by the FWD spike message 604), the post-synaptic neuron also multicasts a BCK spike message towards all of its fan-in neurons (i.e., by sending the BCK spike message to the appropriate synapse cores). In a particular embodiment, the appropriate synapse weights are accessed and sent in BCK synapse weight messages to the appropriate neurons. Upon receiving a BCK synapse weight message, the receiving neuron may fetch its STDP counter value and in-turn its weight update value. If the weight update value is non-zero, the neuron sends a post-synaptic learn (LTP) message to the appropriate synapse core to cause the synapse weight to be incremented. Such operations may be performed by each fan-in neuron.

As an alternative, a back-spike message could be delivered without the synapse weight. In that case, the LTP message sent from the fan-in neuron to the synapse core would include the appropriate weight update value (i.e., $\Delta w$) and (as one possible embodiment) the synapse core could use the weight update value and the current weight value to determine a new synapse weight value. In various embodiments, (e.g., for directed networks), a back-spike message does not change the membrane potential and does not include the weight update values. In other embodiments (e.g., for generative networks such as Restricted Boltzmann Machines or Deep Belief networks), the back-spike messages are functionally identical to forward spikes and include the weight update values.

Figure 7:
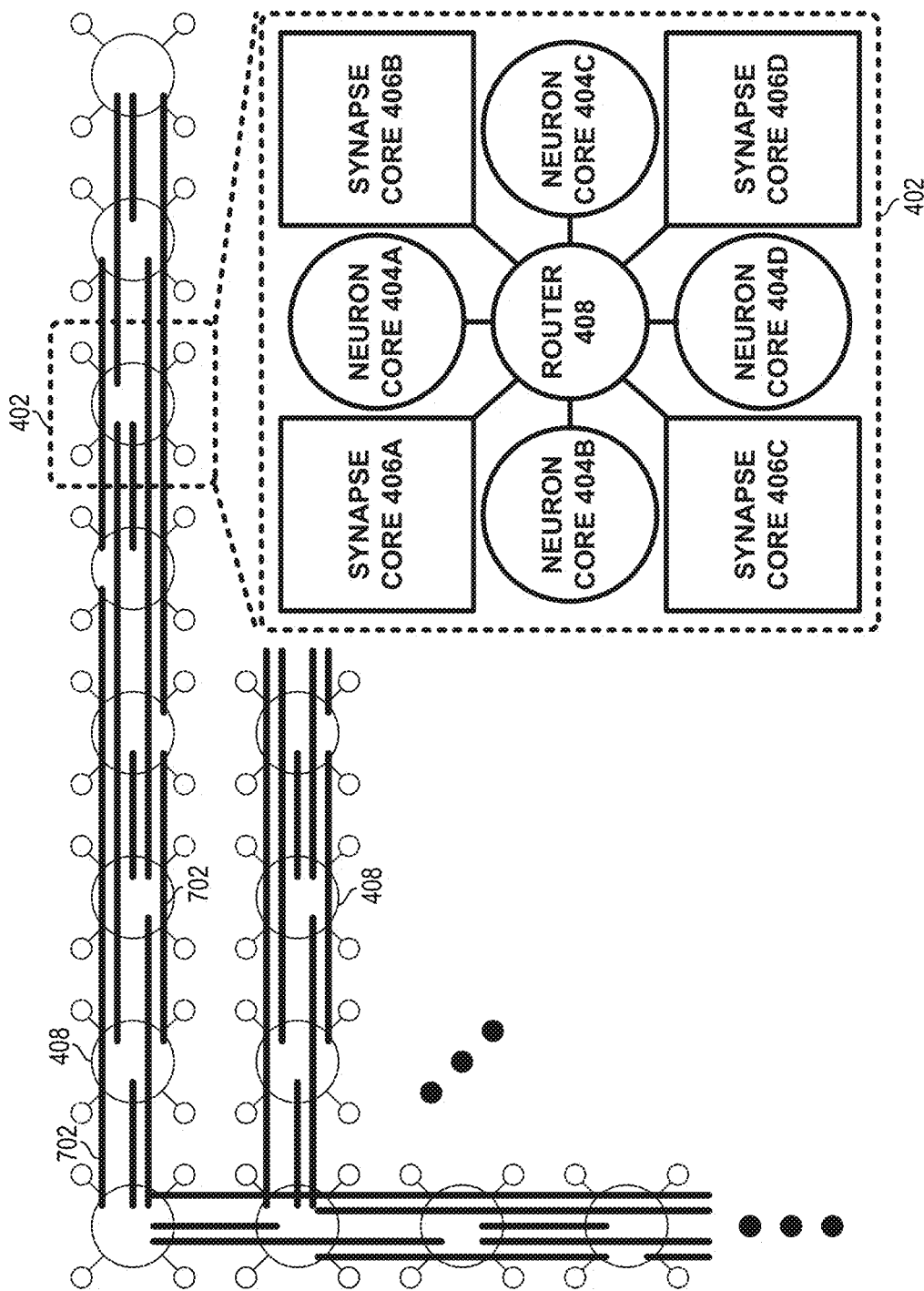
FIG. 7 depicts an example connection scheme of a portion of a neural network in accordance with certain embodiments.

FIG. 7 depicts an example connection scheme of a portion of a neural network in accordance with certain embodiments. In some embodiments, each router 408 may have a binary address (e.g., assigned in accordance with Cartesian coordinates of the router on the NoC) and is connected to other routers 408 having a Hamming distance of one (i.e., those routers whose address differs only by a single bit). In various embodiments, the maximum number of hops per transfer scales logarithmically (base 2) with the total number of routers (e.g., if there are 64 routers, the maximum number of hops is $\log_2 64=6$). For example, if the NoC included 16 routers, a router with address 0000 would be connected to routers with addresses 0001, 0010, 0100, and 1000. In the embodiment depicted, this connection scheme is implemented by the routers being connected via links 702 that have various lengths. This connection scheme may offer a more richly connected environment than a simple mesh, thus reducing the number of messages that are dropped during operation and/or decreasing buffer requirements (in embodiments wherein the messages are buffered). In a particular embodiment, the NoC that implements the neural network is physically arranged as a 2-ary (indicating a Hamming distance of one between each router) 6-flattened-butterfly network (indicating 64 total routers as $2^6=64$). However, in various embodiments, routers 408 may be connected in any suitable manner to couple the neuron cores and the synapse cores of the neurosynaptic core clusters 402 together.

Figure 8:
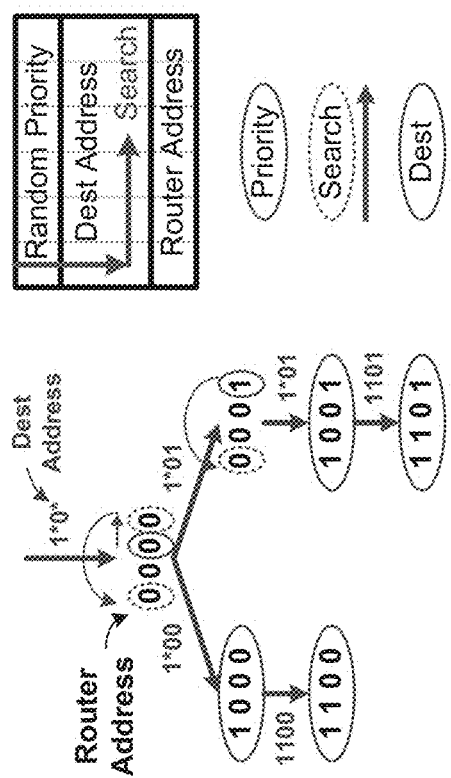
FIG. 8 depicts an example routing flow based on a multicast router address with wildcard bits in accordance with certain embodiments.

FIG. 8 depicts an example routing flow based on a multicast router address with wildcard bits in accordance with certain embodiments. In various embodiments, communication across the neural network is based on wildcard masked multicasting which allows for simultaneous message delivery to multiple cores over the network. The forking behavior of this implementation matches the wildcard masked addressing communication. By introducing wildcard (i.e., "don't care" bits) into the multicast address, a neuron core may send information to multiple synapse cores indicated by the position and number of wildcard bits. In various embodiments, at least a portion of a synapse core address is the address of the router connected to the corresponding neuron synapse core (e.g., the router that includes a port connected to the synapse core).

In an example 16 router system with each router having a unique 4-bit address, a multicast address "1X0X", where X indicates the wildcard bit, represents routers 1000, 1001, 1100, and 1101. The forking behavior of a message with the multicast address "1X0X" is depicted in FIG. 8. In this example, a message with a multicast destination address of "1X0X" is received (e.g., from a neuron core) at a router having an address of 0000. The routing processing is performed a bit at a time. In various embodiments, the bit position that is processed first (depicted as the "priority" bit) is selected at random such that messages sent from a source to a destination do not follow the same path each time (in some embodiments this may increase the accuracy of the neural network when messages are dropped due to network congestion). In the example depicted, the third bit (from the left) is processed first.

When a bit of a destination address is processed, if the corresponding bit in the address of the router processing the address matches the destination address bit (e.g., in the depicted embodiment the third bits are both 0), the router proceeds to the next bit position (e.g., the fourth bit in the depicted embodiment though the order of progression could also be random). When the processed bit of the destination address is the opposite of the corresponding bit of the router, the router generates a next hop address by using the processed bit to replace the corresponding bit of its own address. Thus, in the example depicted, when processing the first bit, the router generates another next hop address of 1000. The router sends the destination address (with modification of any processed wildcard bits) to the next hop address.

If the bit of the destination address is a wildcard bit, then the router treats that bit as if it were both a 0 and a 1, and processes the bit both ways in parallel. The router changes the bit in the destination address to be the opposite value of the router's corresponding bit. For example, the fourth bit of the destination address is * and the fourth bit of the router's address is 0, so the router generates a new destination address of 1*01 (i.e., places a 1 in place of the * at the fourth bit position). The router also modifies the same bit of its own address to generate a next hop address. In this example, the router changes its address 0000 to generate a next hop address of 0001. The router then sends the message to the router that has an address of 0001 with the newly generated destination address (1*01). The router also changes the wildcard bit to the corresponding bit of the router for any future destination addresses the router generates during processing. In this example, the corresponding bit of the fourth position of the address of the router is 0 (thus the router would generate a destination address of 1*00). The router then moves to the next bit position (in this case the first bit). Accordingly, the router at address 0000 sends the message to the router at address 1000 with a destination address of 1*00 (since the wildcard bit in the fourth position was already processed). The router at address 1000 then processes the wildcard bit and send the message to the router at address 1100 with a destination address of 1100.

As described above, the router at address 0001 receives a message with a destination address of 1*01. This router (and any other router receiving a message) may also randomly select the first bit to process (the priority bit), which in the embodiment depicted is the fourth bit. The fourth bit of the router address matches the fourth bit of the destination address, so processing moves to the first bit. The first bits do not match, so the router forwards the message to the router at address 1001 without modifying the destination address. The router at address 1001 then resolves the wildcard bit in the second position by sending the router at address 1101 the message with a destination address of 1101.

When processing the destination address, each router may determine whether its address matches the destination address of the message. This determination may include determining whether the non-wildcard bits of the destination address specified in the message received by the router match the corresponding bits of the router. If these bits match, the router consumes the message and the message is made accessible to one or more synapse cores (based on additional address information specified in the message) connected to the router for processing. In the embodiment depicted, the routers with addresses 1000, 1100, 1001, and 1101 consume the message.

As other examples, the address XXXX may represent all cores (a broadcast), and any address without an X would represent a single core (a unicast message). Unicast messages sent between synapse cores and neuron cores may be processed in a similar manner by the routers, though the forking behavior is not present because such messages will not include wildcard bits.

The number of wildcard bits in the multicast address dictates the number of recipient cores and the positions of the wildcard bits indicate the addresses of these cores. In a particular embodiment, address bits are grouped into pairs in order to enable the encoding of the wildcard X bit. As an example, "11" represents a logic 1 bit, "00" represents a logic 0 bit, and "10" or "01" indicates a wildcard X bit. As a result, in a 16×16 core array where core addresses are 8 bits long, 16 bits would be used to represent the wildcard masked multicasting addresses.

Figure 9:
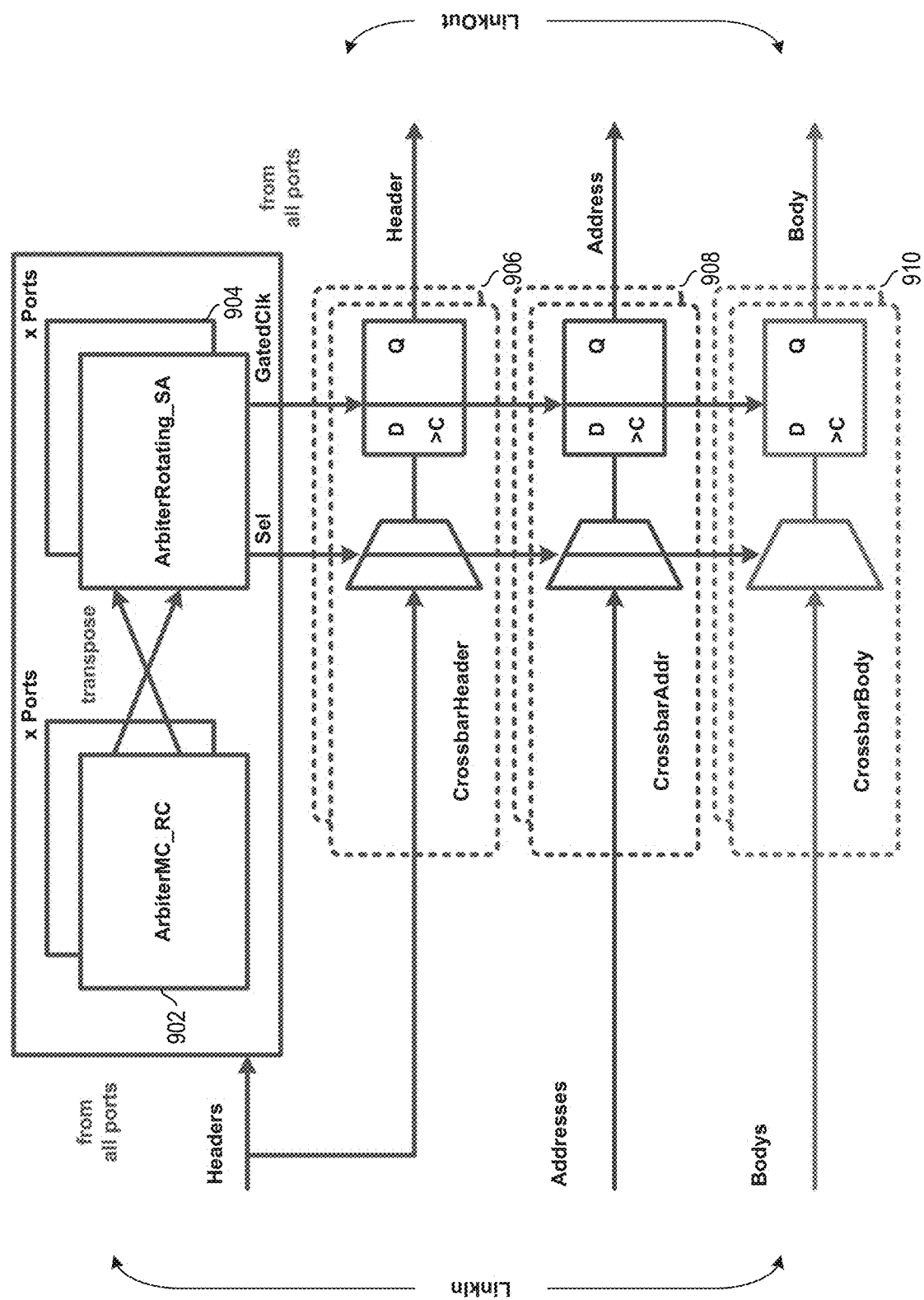
FIG. 9 depicts example arbiters and crossbars of a router in accordance with certain embodiments.

FIG. 9 depicts example arbiters and crossbars of a router 408 in accordance with certain embodiments. The router may utilize the arbiters and crossbars to implement wildcard masked address resolution and message forwarding.

Each input port of a router 408 may include multicast route computation arbiter 902 and each output port may include rotating switch allocation arbiter 904. Arbiter 902 may determine which one or more output ports an incoming message should be sent to (e.g., based on the flow described in FIG. 8 or using other suitable methods) and may send a valid signal to each arbiter 904 of an output port that is connected to a neighboring router that the message is to be sent to. An arbiter 904 may receive a valid signal from one or more of the input ports (via respective arbiters 902) and if it receives multiple valid signals during a particular clock cycle, the arbiter 904 may randomly select one of the input ports. Based on the selected input port, arbiter 904 configures the crossbar logic 906, 908, and 910 to pass the various portions (e.g., header, address, and message body) of the message from the selected input port to the output port associated with the arbiter 904. The same operations may be performed simultaneously by the arbiters 904 of the other output ports.

The messages may be arranged in any suitable format and may include any suitable information. For example, a header may indicate the type of the message (e.g., FWD spike, BCK spike, FWD synapse weight, BCK synapse weight, LTP learn, LTD learn), address portion may include the unicast or multicast destination address (including the router destination address), and (depending on the type of the message) the body may include the address or other identification of a neuron sending or receiving the message, a memory offset value for a synapse array, a sparsity value, a synapse weight value, a weight update value, and/or other suitable information.

In various embodiments, a spike message that is sent from a neuron core to multiple synapse cores may include information associated with multiple different synapse cores in the body of the message. For example, the spike message may include memory offset values and sparsity values specific to each synapse core in the same message that is sent to each of the synapse cores. A spike message may also include multiple memory offset values and sparsity values specific to a single synapse core (e.g., if the synapse core stores mappings for multiple neuron cores coupled to the neuron core sending the message). In other embodiments, a spiking operation may result in multiple spike messages (rather than a single multicast message) being sent to the relevant synapse cores with each spike message including at least one memory offset value and sparsity value associated with the synapse core(s) that the message is addressed to.

As there are multiple type of messages that depend on each other (e.g. a FWD spike message initiating multiple FWD/BCK spike messages), deadlocks can occur on the network. To mitigate this issue, various embodiments use a routing scheme whereby messages on any incoming ports that are competing for the same output port during a clock cycle but are not selected by arbiter 904 are dropped. Thus only one message is transferred to the next router and the other competing messages are dropped. As a result, deadlocks may be avoided. Dropping messages further enables a stochastic spike delivery behavior that is beneficial for classification accuracy in neural networks. To improve the stochastic nature of the routing scheme and for uncorrelated dropping behavior across routers and across time-steps, a linear-feedback shift register (LFSR)-based (or other suitable) random number generator may be included in the router arbiters 904 to drop the messages in a random fashion. By using the same random number generator (or other suitable random number generator) to determine the wildcard address bit processing order, the traffic may be more uniformly distributed across the network. In alternative embodiments, buffering logic could be added to ensure that all messages are delivered.

Figure 10:
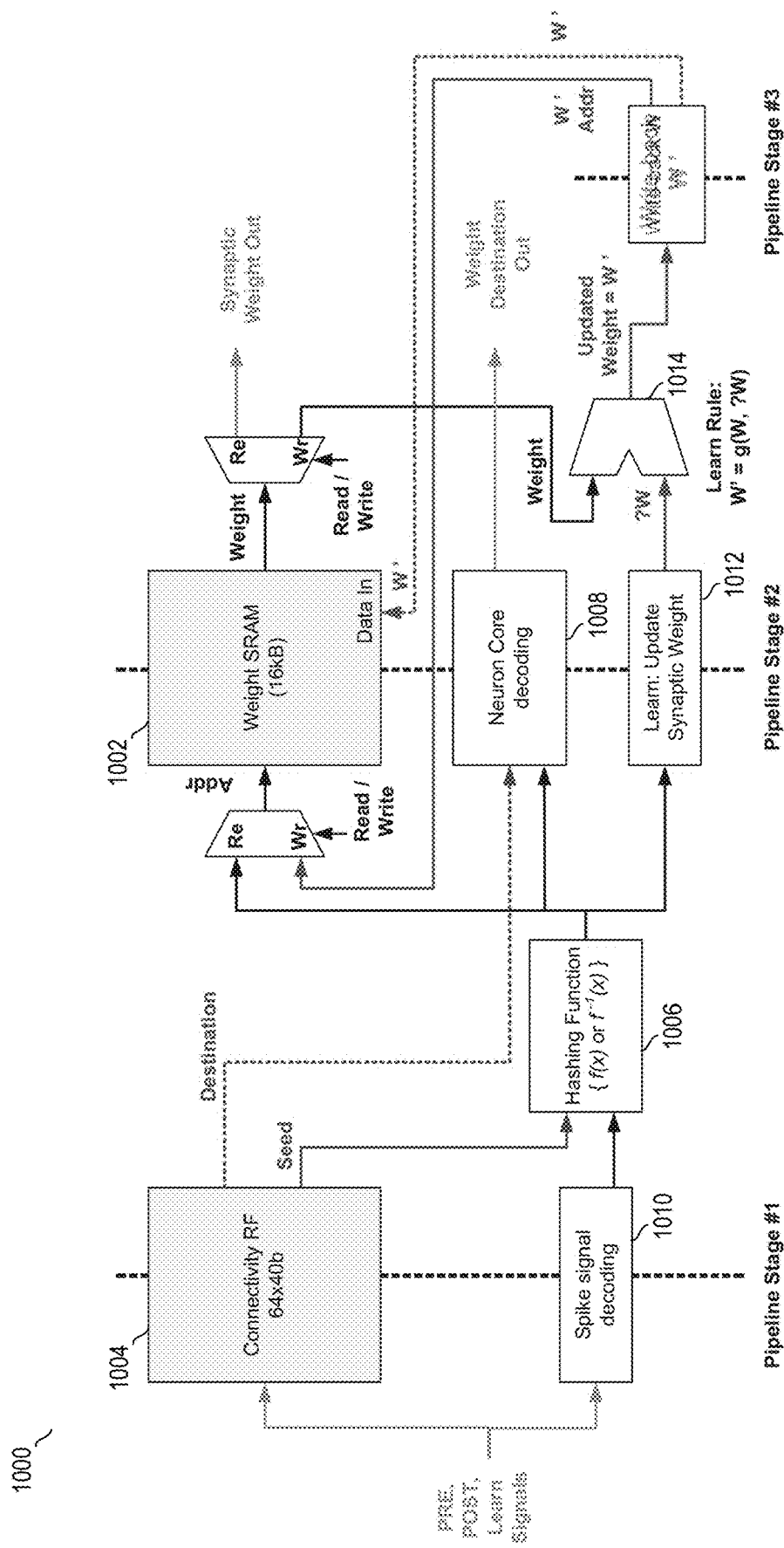
FIG. 10 depicts an example embodiment of a synapse core in accordance with certain embodiments.

FIG. 10 depicts an example embodiment of a synapse core 1000 in accordance with certain embodiments. In the embodiment depicted, synapse core 1000 includes a synapse array depicted as a 16 KB SRAM 1002 storing 8-bit synaptic weights, a 64 entry register file 1004 storing connectivity and sparsity data, and a logic datapath for processing incoming FWD spike (PRE) messages, BCK spike (POST) messages, and learn messages (LTP and LTD messages).

Each entry of the connectivity RF 1004 includes a pre neuron core address, a post neuron core address, and at least one permutation seed. In a particular embodiment, a 64×40 bit RF is used in the synapse to store the 8 bit pre- and post-neuron core destination addresses and four 6 bit permutation seeds for 4 rows of the synapse array 1002.

In the depicted embodiment, the data-path of synapse core 1000 is implemented with three pipeline stages. The RF 1004 and SRAM 1002 are accessed at the first and second pipeline stages, respectively. The FWD spike and BCK spike messages are processed during the first two pipeline stages and result in each accessed synapse weight being unicast to its destination neuron core. To process a learn message, a read-modify-writeback operation is utilized that may take place over all three cycles and result in the accessed weight being updated pursuant to the STDP rule and then written back into the SRAM 1002 during the third clock cycle.

Hashing function logic 1006 may perform a reversible hashing function that allows accessing synaptic weights in post- and pre-directions without the need for keeping track of individual neuron to neuron connections. Therefore, the synapse core only keeps track of final neuron core destinations for the synaptic weights to be unicast (as the within-core neuron to neuron connections may be recovered via the hashing function logic 1006). The sparsity value (i.e., collapse ratio) and the row-offset to access the collapsed neuron-to-neuron connectivity segment (to be explained further in connection with FIG. 11) in the SRAM 1002 are provided in a spike message by the neuron because they are set for a given neuron core when the connectivity is determined. The dynamic on-chip address generation hardware enables reconfigurable and flexible connectivity for a broad range of network types while reducing the use of additional on-chip memory.

As an example, a FWD spike message that includes an identification of a neuron that sent the message (the spiking neuron), a memory offset, and a sparsity value is received. The spike signal decoding logic 1010 identifies the neuron ID included in the message and passes the neuron ID to the hashing function logic 1006. The connectivity RF is accessed based on the neuron core address of the neuron sending the FWD spike message to determine one or more post neuron core addresses (destination addresses) that are associated with the neuron core address in the connectivity RF (e.g., the neuron core address may be compared against the pre neuron core addresses in the entries of the RF). The spike signal decoding 1010 controls iteration through the addresses if multiple post neuron core addresses are identified.

The connectivity RF 1004 outputs a post neuron core address and a permutation seed that is associated with the offset row address included in the FWD spike message. The hashing function performs a hashing function based on the permutation seed and the ID of the spiking neuron to determine which entries of the row in the SRAM 1002 include synapse weights of fan-out neurons of the spiking neuron. Each of these synapse weights is accessed (see "Synaptic Weight Out") and unicast to the appropriate neuron using a FWD synapse weight message along with the address of the neuron core and the ID of the neuron to receive the message (see "Weight Destination Out" output by neuron core decoding 1008).

A similar procedure is followed to process a BCK spike message, except the connectivity RF 1004 outputs the pre neuron core address (that is associated with a post neuron core address received in the BCK spike message) as the destination address and the hashing function logic 1006 performs the inverse hashing function to determine the addresses of the synapse weights of the fan-in neurons.

In various embodiments, the hashing function maps the neuron within the pre core to a portion (e.g., the least significant byte) of the synapse weight SRAM address (which is the same as the within-core post neuron address). Given the pre neuron address, forward hashing gives the synapse weight SRAM address. Given the synapse weight SRAM address, inverse hashing gives the pre neuron address.

When a learn message is received, a similar procedure may be followed to obtain the weight of the appropriate synapse. If the update synaptic weight learn logic 1012 determines that a weight update should be performed, the updated weight is computed by weight update logic 1014 using a learn rule based on the updated weight received in the learn message or based on both the current weight and the received updated weight. The updated weight is then written in the weight SRAM 1002 over the previous weight.

As described above, when a FWD or BCK spike message is received, FWD or BCK synapse weight messages may be sent to multiple neurons connected to the neuron from which the message was received. In that case, the synapse core 406 iterates through each of the destination neurons, accesses each of the corresponding weights, and sends them to the destination neuron. Similar to stochastic spike message delivery whereby messages are dropped at the routers, in various embodiments, ongoing processing of a FWD or BCK spike message at the synapse core may be terminated when a new FWD or BCK message is received to improve the stochastic behavior of the hardware and to eliminate the buffering of incoming spike messages at the synapse core (though in other embodiments buffering may be added). In a particular embodiment, learn messages are prioritized over FWD and BCK spike messages and are not dropped. Since the weight update in this embodiment is a single "read-modify-writeback" type SRAM operation, a learn message drops a single clock cycle of operation in the pipeline during ongoing FWD or BCK spike message processing instead of dropping the whole message. Dropping the FWD or BCK packages at a recurring clock cycle at every algorithm time-step might create a faulty spike correlation and learning behavior on the network. Therefore, in particular embodiments, synaptic weights may be accessed in a random order to prevent such a faulty spike correlation. For example, instead of using a counter to traverse the synapse weights while accessing the row-column pairs in the SRAM during processing of FWD and BCK spike messages, a random number generator (e.g., an LFSR based random number generator) may be used to randomize the access patterns. By initializing the random number generators in different synapse cores with different values, the dropping of individual weights is uncorrelated in between received spikes and across synapse blocks.

Figure 11:
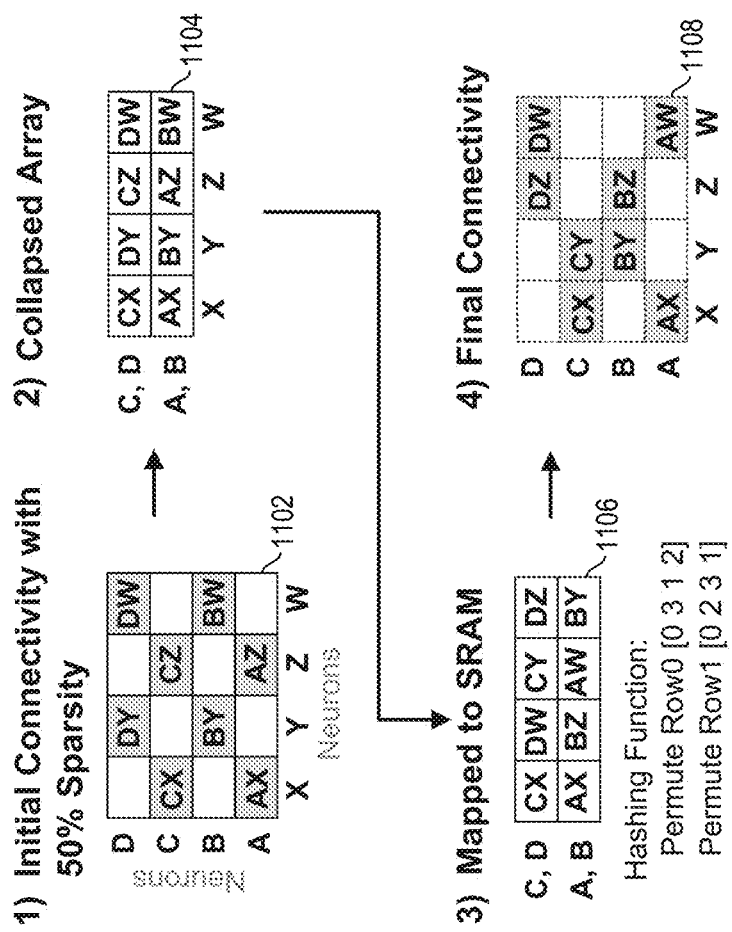
FIG. 11 depicts an example connectivity of neurons with an example sparsity in accordance with certain embodiments.

FIG. 11 depicts an example connectivity of neurons with an example sparsity in accordance with certain embodiments. Specifically, FIG. 11 depicts a 4×4 connectivity of neurons A, B, C, D to X, Y, Z, W with 50% sparsity. The teachings of this example may be extrapolated to larger sets of connectivity between neurons of two different neuron cores.

A baseline initial connectivity is shown in 1102 with shaded boxes depicting neuron to neuron connections. For purposes of explanation, neurons A, B, C, and D may be neurons of a first core and neurons X, Y, Z, and W may be neurons of a second core. Thus an entry in the connectivity RF 1004 associated with a mapping between this first core and this second core may include the address of the first core as the pre neuron core address and the address of the second core as the post neuron core address. A desired sparsity value is configured for the neuron to neuron connections of the two cores. In one embodiment, a sparsity value (e.g., a 3-bit value) may be selected from allowable sparsity ratios of 100% "no collapse" (i.e., densely connected), 50%, 25%, 12.5%, and 6.25%, and (0%) (i.e., no connectivity). These particular sparsity values lead to efficient usage of synapse array memory, though any suitable collapse ratios may be used. In various embodiments, the sparsity value may be configured for each neuron core to neuron core connection mapping. Thus, in one example, a sparsity value may be assigned to each 64×64 segment of neuron core to neuron core connections.

In the embodiment depicted, a sparsity of 50% has been selected for the connection mapping. Accordingly, each neuron of the first core is connected to 50% of the neurons of the second core. The baseline initial connectivity may be a repeating or other deterministic pattern (such as that shown in 1102). The sparsity value determines the amount of synapse array memory required to store the synapse weights for the neuron core to neuron core connection (because synapse weights for unconnected neurons do not need to be stored). Accordingly, the baseline initial connectivity may be collapsed into a 2×4 dense array 1104. If the collapsed array were to be stored in the synapse array, indications of the individual neuron to neuron connectivity (e.g., D is connected to Y, A is connected to Z, etc.) would not need to be stored because the deterministic pattern of the connectivity combined with the ordered storage of the data in the synapse array would allow inference of the neurons that are associated with each synapse weight. However, neural networks benefit from random, pseudo-random, or other desired connectivity between neurons. Accordingly, a hashing function of hashing function logic 1006 may be used to permute the collapsed array. The result is the permuted array 1106 which results in the connectivity shown by 1108 (which is much different from the deterministic connectivity shown in 1102). In one embodiment, a row of the array is permuted by shuffling the columns (i.e., the neurons of the second core) according to a permutation seed. In a particular embodiment, each row of a collapsed array is permuted based on a randomly selected permutation seed. The permutation seeds are stored in the connectivity RF to allow the determination of the individual neuron to neuron connections based on the locations of the synapse weights in the synapse array memory when a message is received at the synapse core.

This method provides a dense on-chip physical mapping even for sparse SNNs in which the connection mappings for an entire row (or other portion) of the synapse row may be recovered from a sparsity ratio and a permutation seed. In various embodiments, when the sparsity ratio is less than 100%, unused memory partitions may be turned off to save power. Thus, an on-chip dynamic address generation mechanism may be employed to minimize the use of additional connectivity memory to save area and power. In various embodiments, the hashing function logic may utilize finite field multiplication when accessing synaptic weights. The hashing function may receive an address of a neuron and may generate addresses for all of the fan-out or fan-in neurons coupled to that neuron, thus eliminating the need for a lookup table that stores all of the connectivities. In effect, the hashing function is a permutation mapping function.

Figure 12:
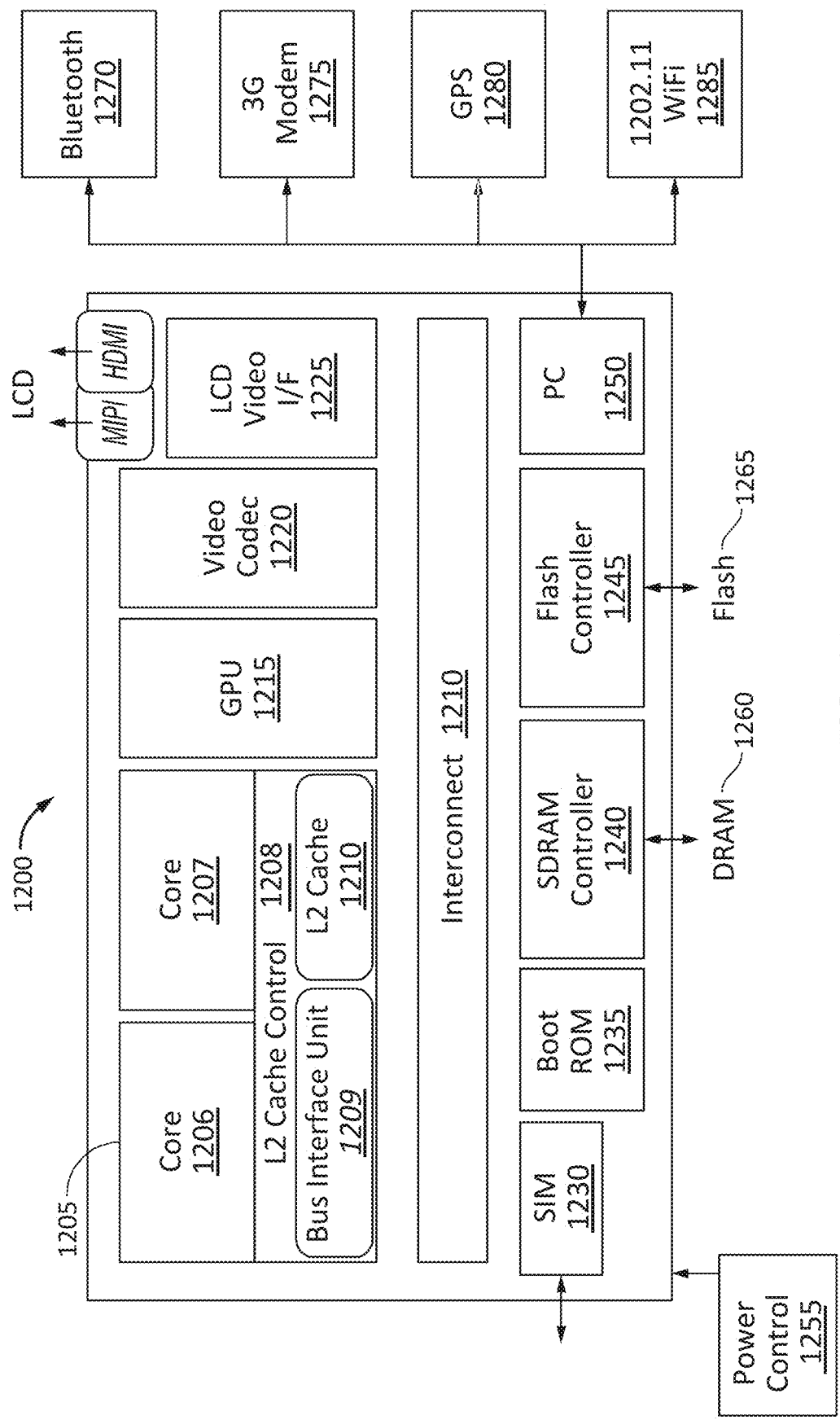
FIG. 12 illustrates a block diagram for an example computing system that may implement a neural network in accordance with certain embodiments.

In FIG. 12, an embodiment of a system on-chip (SOC) design in accordance with the disclosures is depicted. In a particular embodiment, an SOC may include a neural network as described herein. As a specific illustrative example, SOC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Similar to the discussion above, cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure. Any of these components may incorporate aspects of the disclosure described herein.

Interface 1210 provides communication channels to the other components, such as a Subscriber Identity Module (SIM) 1230 to interface with a SIM card, a boot rom 1235 to hold boot code for execution by cores 1206 and 1207 to initialize and boot SOC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein.

In addition, the system illustrates power control 1255 and peripherals for communication, such as a Bluetooth module 1270, 3G modem 1275, GPS 1280, and WiFi 1285. Note as stated above, a UE includes a radio for communication. As a result, these peripheral communication modules are not all required. However, in a UE some form a radio for external communication is to be included.

Figure 13:
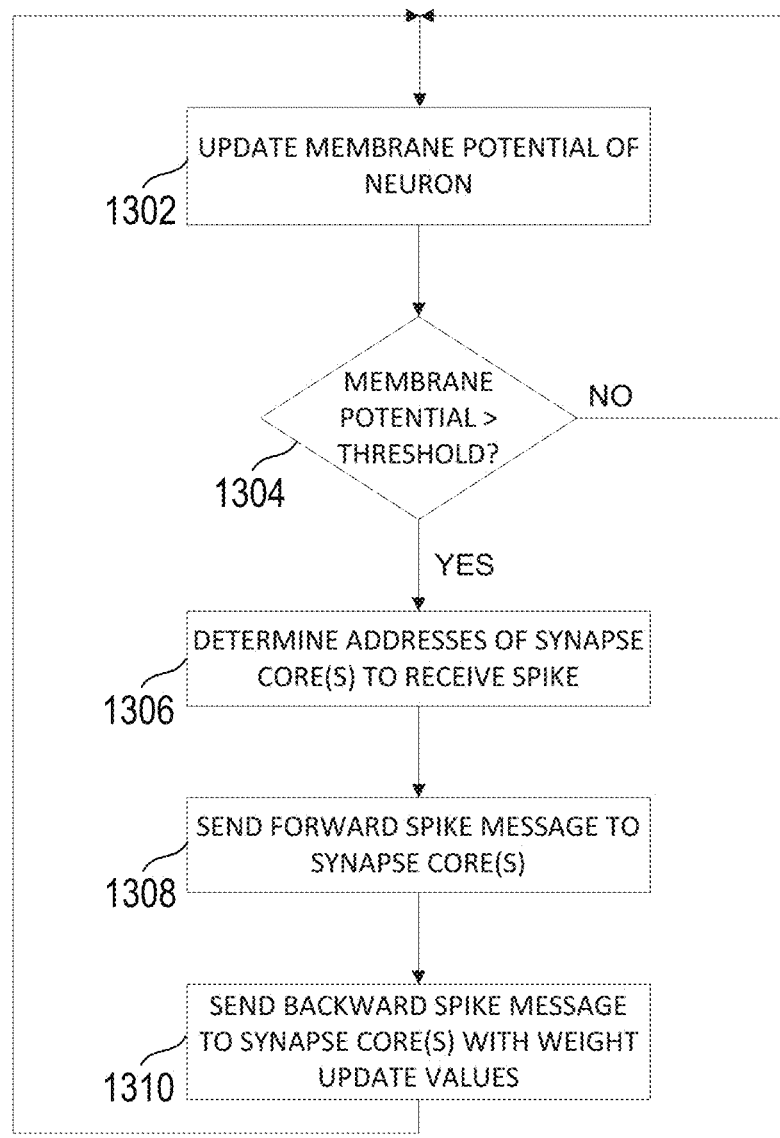
FIG. 13 illustrates an example flow for sending spike messages in accordance with certain embodiments.

FIG. 13 illustrates an example flow for sending spike messages in accordance with certain embodiments. At 1302, the membrane potential of a neuron is updated. The membrane potential may be updated as a function of the last calculated membrane potential of the neuron, one or more input bias values, one or more leakage time constants, and/or other suitable inputs. At 1304, a determination is made as to whether the updated membrane potential exceeds a threshold of the neuron. If the threshold is not exceeded, the flow returns to 1302 where the neuron's membrane potential is updated at the next time-step.

If the threshold is exceeded, address of synapse cores to receive a spike message from the neuron are determined at 1306. These synapse cores may include one or more synapse cores that store fan-in synapse weights (i.e., the synapse weights for synapses between the neuron and the fan-in neurons) and/or fan-out synapse weights (i.e., the synapse weights for synapses between the neuron and the fan-out neurons).

At 1308, a forward spike message is sent to the synapse core(s) that store the fan-out synapses and at 1310, backward spike messages are sent to synapse core(s) that store the fan-out synapses. The backward spike messages may include respective weight update values. The flow may then return to 1302.

Some of the operations illustrated in FIG. 13 may be repeated, combined, modified or deleted where appropriate, and additional operations may also be added to the flowchart. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the functionality of the various components (or subcomponents of these components) such as processor 100, router 204, core 208, the neurons, neuron cores 404, synapse cores 406, routers 408, the various memory arrays, or other component described herein. "Logic" may refer to hardware, firmware, software and/or combinations of each to perform one or more functions. As an example, logic may include hardware, such as a micro-controller or processor, associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

In at least one embodiment, a processor comprises a plurality of synapse cores to store a plurality of synapse weights of a neural network, a synapse core of the plurality of synapse cores comprising at least one synapse memory array to store a subset of the plurality of synapse weights; a plurality of neuron cores comprising a plurality of neurons, a first neuron core of the plurality of neuron cores comprising membrane potential update logic, the first neuron core to determine that a membrane potential of a first neuron of the first neuron core exceeds a threshold; determine a first plurality of synapse cores that each store at least one synapse weight associated with the first neuron; and send a spike message to the determined first plurality of synapse cores. In an embodiment, the spike message includes a multicast address including at least one wildcard bit, wherein the multicast address matches addresses of the determined first plurality of synapse cores. In an embodiment, the processor further comprises a first router to receive the spike message; process a first wildcard bit of the multicast address; generate a modified address by modifying the multicast address at the processed bit; and send the spike message with the modified address to a second router. In an embodiment, the spike message includes a sparsity value indicating the density of the connectivity of neurons of the first neuron core to neurons of a second neuron core. In an embodiment, the sparsity value indicating the density of the connectivity of neurons of the first neuron core to neurons of a second neuron core is selected from a plurality of allowable sparsity values and stored at the first neuron core. In an embodiment, the spike message includes a memory offset address associated with a synapse array of a first synapse core of the determined first plurality of synapse cores. In an embodiment, a first synapse core of the plurality of synapse cores includes an entry of a connectivity matrix storing a permutation seed associated with a portion of a synapse array of the first synapse core, wherein the permutation seed is used by a hash function to set neuron to neuron connectivity within the portion of the synapse array. In an embodiment, the first synapse core is to receive the spike message; and access the permutation seed to determine one or more address locations of the synapse array at which synapse weights associated with the first neuron are stored. In an embodiment, the processor further comprises a plurality of routers to couple the plurality of synapse cores and the plurality of neuron cores, wherein a first router of the plurality of routers is connected directly to routers of the plurality of routers that have a Hamming distance of one from the first router. In an embodiment, the processor further comprises a plurality of routers to couple the plurality of synapse cores and the plurality of neuron cores, wherein a first router of the plurality of routers is to begin routing processing of the spike message at a first bit position of a destination address of the spike message, wherein the first bit position is selected randomly by the router. In an embodiment, a first synapse core of the determined first plurality of synapse cores is to receive the spike message; access a plurality of synapse weights associated with the first neuron; and send a first synapse weight of the plurality of synapse weights to a destination neuron in a unicast message, wherein the first synapse weight is further associated with the destination neuron. In an embodiment, the first neuron is further to access a spike-timing dependent plasticity (STDP) counter in response to receiving an indication of a spike with an associated synapse weight from a first synapse core; and send a weight update value based at least on the STDP counter to the first synapse core to update the synapse weight. In an embodiment, the first synapse core is further to in response to receiving the weight update value, access the synapse weight; determine an updated synapse weight based at least in part on the weight update value and the accessed synapse weight; and write the updated synapse weight over the accessed synapse weight. In an embodiment, the spike message is associated with the fan-out neurons of the first neuron and the first neuron is further to send a backwards spike message associated with fan-in neurons of the first neuron to cause at least a portion of the fan-in neurons to send weight update values based on STDP counters tracked by the fan-in neurons. In an embodiment, a first synapse core of the plurality of synapse core is further to receive a first weight update value of the plurality of weight update values; and update a synapse weight of a synapse associated with a first fan-in neuron of the fan-in neurons.

In at least one embodiment, a method comprises determining that a membrane potential of a first neuron of a first neuron core exceeds a threshold; determining a first plurality of synapse cores that each store at least one synapse weight associated with the first neuron; and sending a spike message to the determined first plurality of synapse cores.

In an embodiment, the spike message includes a multicast address including at least one wildcard bit, wherein the multicast address matches addresses of the determined first plurality of synapse cores. In an embodiment, a method further comprises receiving the spike message at a first router; processing a first wildcard bit of the multicast address; generating a modified address by modifying the multicast address at the processed bit; and sending the spike message with the modified address to a second router. In an embodiment, the spike message includes a sparsity value indicating the density of the connectivity of neurons of the first neuron core to neurons of a second neuron core. In an embodiment, the sparsity value indicating the density of the connectivity of neurons of the first neuron core to neurons of a second neuron core is selected from a plurality of allowable sparsity values and stored at the first neuron core. In an embodiment, the spike message includes a memory offset address associated with a synapse array of a first synapse core of the determined first plurality of synapse cores. In an embodiment, a first synapse core of the plurality of synapse cores includes an entry of a connectivity matrix storing a permutation seed associated with a portion of a synapse array of the first synapse core, wherein the permutation seed is used by a hash function to set neuron to neuron connectivity within the portion of the synapse array. In an embodiment, a method further comprises receiving the spike message at the first synapse core; and accessing the permutation seed to determine one or more address locations of the synapse array at which synapse weights associated with the first neuron are stored. In an embodiment, a method further comprises sending messages between the plurality of synapse cores and the plurality of neuron cores via a plurality of routers, wherein a first router of the plurality of routers is connected directly to routers of the plurality of routers that have a Hamming distance of one from the first router. In an embodiment, a method further comprises beginning, by a router, routing processing of the spike message at a first bit position of a destination address of the spike message, wherein the first bit position is selected randomly by the router. In an embodiment, a method further comprises receiving the spike message at a first synapse core; accessing a plurality of synapse weights associated with the first neuron; and sending a first synapse weight of the plurality of synapse weights to a destination neuron in a unicast message, wherein the first synapse weight is further associated with the destination neuron. In an embodiment, a method further comprises accessing a spike-timing dependent plasticity (STDP) counter in response to receiving an indication of a spike with an associated synapse weight from a first synapse core; and sending a weight update value based at least on the STDP counter to the first synapse core to update the synapse weight.

In at least one embodiment, a non-transitory machine readable storage medium has instructions stored thereon, the instructions when executed by a machine to cause the machine to determine that a membrane potential of a first neuron of a first neuron core exceeds a threshold; determine a first plurality of synapse cores that each store at least one synapse weight associated with the first neuron; and send a spike message to the determined first plurality of synapse cores. In an embodiment, the spike message includes a multicast address including at least one wildcard bit, wherein the multicast address matches addresses of the determined first plurality of synapse cores.

In an embodiment, the spike message includes a sparsity value indicating the density of the connectivity of neurons of the first neuron core to neurons of a second neuron core. In an embodiment, the spike message includes a memory offset address associated with a synapse array of a first synapse core of the determined first plurality of synapse cores. In an embodiment, the instructions when executed are further to cause the machine to access a spike-timing dependent plasticity (STDP) counter in response to receiving an indication of a spike with an associated synapse weight from a first synapse core; and send a weight update value based at least on the STDP counter to the first synapse core to update the synapse weight.

In at least one embodiment, a system comprises means to determine that a membrane potential of a first neuron of a first neuron core exceeds a threshold; determine a first plurality of synapse cores that each store at least one synapse weight associated with the first neuron; and send a spike message to the determined first plurality of synapse cores.

In an embodiment, the spike message includes a multicast address including at least one wildcard bit, wherein the multicast address matches addresses of the determined first plurality of synapse cores. In an embodiment, the spike message includes a sparsity value indicating the density of the connectivity of neurons of the first neuron core to neurons of a second neuron core. In an embodiment, the spike message includes a memory offset address associated with a synapse array of a first synapse core of the determined first plurality of synapse cores.

In an embodiment, the system further comprises means to access a spike-timing dependent plasticity (STDP) counter in response to receiving an indication of a spike with an associated synapse weight from a first synapse core; and means to send a weight update value based at least on the STDP counter to the first synapse core to update the synapse weight.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
a plurality of synapse cores to store a plurality of synapse weights of a neural network, a synapse core of the plurality of synapse cores comprising at least one synapse memory array to store a subset of the plurality of synapse weights;
a plurality of neuron cores comprising a plurality of neurons, a first neuron core of the plurality of neuron cores comprising membrane potential update logic, the first neuron core to:
determine that a membrane potential of a first neuron of the first neuron core exceeds a threshold;
determine a first plurality of synapse cores that each store at least one synapse weight associated with the first neuron; and
send a spike message to the determined first plurality of synapse cores, wherein the spike message includes a sparsity value indicating the density of the connectivity of neurons of the first neuron core to neurons of a second neuron core.

2. The processor of claim 1, wherein the spike message includes a multicast address including at least one wildcard bit, wherein the multicast address matches addresses of the determined first plurality of synapse cores.

3. The processor of claim 2, the processor further comprising:
a first router to:
receive the spike message;
process a first wildcard bit of the multicast address;
generate a modified address by modifying the multicast address at the processed bit; and
send the spike message with the modified address to a second router.

4. The processor of claim 1, wherein the sparsity value indicating the density of the connectivity of neurons of the first neuron core to neurons of the second neuron core is selected from a plurality of allowable sparsity values and stored at the first neuron core.

5. The processor of claim 1, wherein the spike message includes a memory offset address associated with a synapse array of a first synapse core of the determined first plurality of synapse cores.

6. The processor of claim 1, wherein a first synapse core of the plurality of synapse cores includes an entry of a connectivity matrix storing a permutation seed associated with a portion of a synapse array of the first synapse core, wherein the permutation seed is used by a hash function to set neuron to neuron connectivity within the portion of the synapse array.

7. The processor of claim 6, wherein the first synapse core is to:
receive the spike message; and
access the permutation seed to determine one or more address locations of the synapse array at which synapse weights associated with the first neuron are stored.

8. The processor of claim 1, the processor further comprising a plurality of routers to couple the plurality of synapse cores and the plurality of neuron cores, wherein a first router of the plurality of routers is connected directly to routers of the plurality of routers that have a Hamming distance of one from the first router.

9. The processor of claim 1, the processor further comprising a plurality of routers to couple the plurality of synapse cores and the plurality of neuron cores, wherein a first router of the plurality of routers is to begin routing processing of the spike message at a first bit position of a destination address of the spike message, wherein the first bit position is selected randomly by the router.

10. The processor of claim 1, wherein a first synapse core of the determined first plurality of synapse cores is to:
receive the spike message;
access a plurality of synapse weights associated with the first neuron; and
send a first synapse weight of the plurality of synapse weights to a destination neuron in a unicast message, wherein the first synapse weight is further associated with the destination neuron.

11. The processor of claim 1, wherein the first neuron is further to:
access a spike-timing dependent plasticity (STDP) counter in response to receiving an indication of a spike with an associated synapse weight from a first synapse core; and
send a weight update value based at least on the STDP counter to the first synapse core to update the synapse weight.

12. The processor of claim 11, wherein the first synapse core is further to:
in response to receiving the weight update value, access the synapse weight;
determine an updated synapse weight based at least in part on the weight update value and the accessed synapse weight; and
write the updated synapse weight over the accessed synapse weight.

13. The processor of claim 1, wherein the spike message is associated with the fan-out neurons of the first neuron and the first neuron is further to send a backwards spike message associated with fan-in neurons of the first neuron to cause at least a portion of the fan-in neurons to send weight update values based on STDP counters tracked by the fan-in neurons.

14. The processor of claim 13, wherein a first synapse core of the plurality of synapse cores is further to:
receive a first weight update value of the plurality of weight update values; and
update a synapse weight of a synapse associated with a first fan-in neuron of the fan-in neurons.

15. A method comprising:
determining that a membrane potential of a first neuron of a first neuron core exceeds a threshold;
determining a first plurality of synapse cores that each store at least one synapse weight associated with the first neuron; and
sending a spike message to the determined first plurality of synapse cores, wherein the spike message includes a sparsity value indicating the density of the connectivity of neurons of the first neuron core to neurons of a second neuron core.

16. The method of claim 15, wherein the spike message includes a multicast address including at least one wildcard bit, wherein the multicast address matches addresses of the determined first plurality of synapse cores.

17. The method of claim 15, wherein the spike message includes a memory offset address associated with a synapse array of a first synapse core of the determined first plurality of synapse cores.

18. The method of claim 15, further comprising:

accessing a spike-timing dependent plasticity (STDP) counter in response to receiving an indication of a spike with an associated synapse weight from a first synapse core; and sending a weight update value based at least on the STDP counter to the first synapse core to update the synapse weight.

19. A non-transitory machine readable storage medium having instructions stored thereon, the instructions when executed by a machine to cause the machine to:

determine that a membrane potential of a first neuron of a first neuron core exceeds a threshold;

determine a first plurality of synapse cores that each store at least one synapse weight associated with the first neuron; and send a spike message to the determined first plurality of synapse cores, wherein the spike message includes a sparsity value indicating the density of the connectivity of neurons of the first neuron core to neurons of a second neuron core.

20. The medium of claim 19, wherein the spike message includes a multicast address including at least one wildcard bit, wherein the multicast address matches addresses of the determined first plurality of synapse cores.

21. The medium of claim 19, wherein the spike message includes a memory offset address associated with a synapse array of a first synapse core of the determined first plurality of synapse cores.

22. The medium of claim 19, the instructions when executed to further cause the machine to:

access a spike-timing dependent plasticity (STDP) counter in response to receiving an indication of a spike with an associated synapse weight from a first synapse core; and send a weight update value based at least on the STDP counter to the first synapse core to update the synapse weight.

* * * * *